United States Patent
Park et al.

(10) Patent No.: US 10,880,363 B2
(45) Date of Patent: Dec. 29, 2020

(54) INTEGRATING LOGIC IN MICRO BATCH BASED EVENT PROCESSING SYSTEMS

(71) Applicant: Oracle International Corporation, Redwood Shores, CA (US)

(72) Inventors: Hoyong Park, San Jose, CA (US); Gyorgy Geiszter, Budapest (HU); Dmitrii Andreevich Strizhikozin, St. Petersburg (RU); Péter Gordos, Budapest (HU); Prabhu Thukkaram, San Ramon, CA (US); Vitaly Bychkov, Foster City, CA (US); Dmitrii Markovskii, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/559,913

(22) Filed: Sep. 4, 2019

(65) Prior Publication Data
US 2019/0394259 A1 Dec. 26, 2019

Related U.S. Application Data

(63) Continuation of application No. PCT/RU2017/000136, filed on Mar. 17, 2017.

(51) Int. Cl.
*H04L 29/08* (2006.01)
*G06F 16/2455* (2019.01)
*G06F 16/901* (2019.01)

(52) U.S. Cl.
CPC ........ *H04L 67/10* (2013.01); *G06F 16/24568* (2019.01); *G06F 16/9024* (2019.01)

(58) Field of Classification Search
CPC . H04L 67/10; G06F 16/24568; G06F 16/9024
See application file for complete search history.

(56) References Cited

U.S. PATENT DOCUMENTS 6,501,852 B1   12/2002   Clark et al.
6,633,867 B1   10/2003   Kraft et al.
(Continued)

FOREIGN PATENT DOCUMENTS

JP   2006338432   12/2006
JP   2007513426   5/2007
(Continued)

OTHER PUBLICATIONS

Cluster Mode Overview, Spark 2.0.0 Documentation, Available online at: http://spark.apache.org:80/docs/2.0.0/cluster-overview.html, Sep. 3, 2016, 3 pages.
(Continued)

*Primary Examiner* — Kristie D Shingles
(74) *Attorney, Agent, or Firm* — Kilpatrick Townsend & Stockton LLP

(57) ABSTRACT

A distributed event processing system is disclosed that receives continuous data streams, registers a continuous query against the data streams, and continuously executes the query as new data appears in the streams. In certain embodiments, the distributed event processing system deploys and executes applications (e.g., event processing applications) by distributing the execution of the application on a cluster of machines within the system. In certain embodiments, the system provides users with the ability to specify logical rules in an application. The system processes the logical rules by generating a DAG of transformations representing the logical rules and converts the DAG of transformations into a logical rules Resilient Distributed Dataset (RDD) DAG of transformations. The system processes events in an event batch against the RDD DAG of transformations to generate a set of output results for the user.

20 Claims, 15 Drawing Sheets

(56) References Cited

U.S. PATENT DOCUMENTS

| | | |
|---|---|---|
| 6,905,019 B2 | 6/2005 | Lacomis |
| 6,986,019 B1 | 1/2006 | Bagashev et al. |
| 7,139,977 B1 | 11/2006 | Russell |
| 7,284,041 B2 | 10/2007 | Nakatani et al. |
| 7,546,284 B1 | 6/2009 | Martinez et al. |
| 8,190,738 B2 | 5/2012 | Ruehle |
| 8,195,648 B2 | 6/2012 | Zabback et al. |
| 8,260,803 B2 | 9/2012 | Hsu et al. |
| 8,713,038 B2 | 4/2014 | Cohen et al. |
| 8,918,371 B1 | 12/2014 | Prikhodko et al. |
| 9,244,978 B2 | 1/2016 | Alves et al. |
| 9,286,352 B2 | 3/2016 | Park et al. |
| 9,298,788 B1 | 3/2016 | Kekre et al. |
| 9,405,854 B2 | 8/2016 | Jerzak et al. |
| 9,424,150 B2 | 8/2016 | Jerzak et al. |
| 9,535,761 B2 | 1/2017 | Park et al. |
| 9,672,082 B2 | 6/2017 | Thukkaram et al. |
| 9,712,645 B2 | 7/2017 | De Castro Alves et al. |
| 9,894,147 B1 | 2/2018 | Zalpuri et al. |
| 9,934,263 B1 | 4/2018 | Black et al. |
| 9,972,103 B2 | 5/2018 | De Castro Alves et al. |
| 10,095,547 B1 | 10/2018 | Kulkarni et al. |
| 10,120,907 B2 | 11/2018 | De Castro Alves et al. |
| 10,217,256 B2 | 2/2019 | De Castro Alves et al. |
| 2002/0056004 A1 | 5/2002 | Smith et al. |
| 2005/0027698 A1 | 2/2005 | Collet et al. |
| 2005/0119988 A1* | 6/2005 | Buch .................. G16H 50/70 |
| 2005/0192921 A1 | 9/2005 | Chaudhuri et al. |
| 2006/0167869 A1 | 7/2006 | Jones |
| 2006/0218123 A1 | 9/2006 | Chowdhuri et al. |
| 2007/0168154 A1 | 7/2007 | Ericson |
| 2007/0250487 A1 | 10/2007 | Reuther |
| 2008/0021914 A1 | 1/2008 | Davies |
| 2008/0072221 A1 | 3/2008 | Chkodrov et al. |
| 2008/0098370 A1 | 4/2008 | Fontoura et al. |
| 2008/0133594 A1 | 6/2008 | Fotinatos et al. |
| 2008/0165127 A1 | 7/2008 | Eom |
| 2008/0301135 A1 | 12/2008 | De Castro Alves et al. |
| 2009/0089078 A1 | 4/2009 | Bursey |
| 2009/0106190 A1 | 4/2009 | Srinivasan et al. |
| 2009/0106214 A1 | 4/2009 | Jain et al. |
| 2009/0125536 A1* | 5/2009 | Lu .................... G06F 16/24568 |
| 2009/0125916 A1 | 5/2009 | Lu et al. |
| 2009/0216728 A1 | 8/2009 | Brainerd et al. |
| 2009/0292759 A1 | 11/2009 | Piper et al. |
| 2010/0022627 A1 | 1/2010 | Scherer |
| 2010/0030896 A1 | 2/2010 | Chandramouli et al. |
| 2010/0125572 A1 | 5/2010 | Poblete et al. |
| 2010/0250572 A1 | 9/2010 | Chen et al. |
| 2011/0035253 A1 | 2/2011 | Mason et al. |
| 2011/0084967 A1 | 4/2011 | De Pauw et al. |
| 2011/0126201 A1 | 5/2011 | Iyer et al. |
| 2011/0196891 A1 | 8/2011 | De Castro Alves et al. |
| 2011/0213802 A1 | 9/2011 | Singh et al. |
| 2011/0302164 A1 | 12/2011 | Krishnamurthy et al. |
| 2012/0078951 A1 | 3/2012 | Hsu et al. |
| 2012/0131139 A1 | 5/2012 | Siripurapu et al. |
| 2012/0158783 A1* | 6/2012 | Nice .................... G06Q 50/01 |
| | | 707/776 |
| 2012/0185584 A1 | 7/2012 | Pandit |
| 2012/0259910 A1 | 10/2012 | Andrade et al. |
| 2012/0331333 A1 | 12/2012 | Imaki |
| 2013/0073586 A1 | 3/2013 | Aubry et al. |
| 2013/0080413 A1 | 3/2013 | Chen et al. |
| 2013/0262502 A1 | 10/2013 | Majeed et al. |
| 2014/0006474 A1 | 1/2014 | White et al. |
| 2014/0059109 A1 | 2/2014 | Jugel |
| 2014/0095425 A1 | 4/2014 | Sipple |
| 2014/0095444 A1 | 4/2014 | Deshmukh et al. |
| 2014/0095445 A1* | 4/2014 | Deshmukh ........ G06F 16/24542 |
| | | 707/661 |
| 2014/0095446 A1 | 4/2014 | Deshmukh et al. |
| 2014/0095535 A1 | 4/2014 | Deshmukh et al. |
| 2014/0156683 A1 | 6/2014 | De Castro Alves |
| 2014/0172506 A1 | 6/2014 | Parsell et al. |
| 2014/0195559 A1 | 7/2014 | Ko et al. |
| 2014/0324530 A1 | 10/2014 | Thompson et al. |
| 2014/0372550 A1 | 12/2014 | Said et al. |
| 2015/0103837 A1 | 4/2015 | Dutta |
| 2015/0121175 A1 | 4/2015 | Schoning |
| 2015/0169786 A1* | 6/2015 | Jerzak ................ G06F 16/9024 |
| | | 707/755 |
| 2015/0363464 A1 | 12/2015 | De Castro Alves et al. |
| 2015/0381712 A1 | 12/2015 | De Castro Alves et al. |
| 2016/0004751 A1 | 1/2016 | Lafuente Alvarez et al. |
| 2016/0063080 A1 | 3/2016 | Nano et al. |
| 2016/0085772 A1 | 3/2016 | Vermeulen et al. |
| 2016/0085810 A1 | 3/2016 | De Castro Alves et al. |
| 2016/0171067 A1 | 6/2016 | Acker |
| 2016/0232230 A1 | 8/2016 | Radivojevic |
| 2016/0239272 A1 | 8/2016 | Petri |
| 2016/0283610 A1 | 9/2016 | Simitsis et al. |
| 2016/0306827 A1 | 10/2016 | Dos Santos et al. |
| 2016/0328432 A1 | 11/2016 | Raghunathan |
| 2017/0024912 A1 | 1/2017 | De Castro Alves et al. |
| 2017/0075693 A1 | 3/2017 | Bishop et al. |
| 2017/0116050 A1 | 4/2017 | Thukkaram et al. |
| 2017/0116289 A1 | 4/2017 | Deshmukh et al. |
| 2017/0228253 A1 | 8/2017 | Layman et al. |
| 2017/0322838 A1 | 11/2017 | Winters et al. |
| 2017/0339203 A1 | 11/2017 | Kekre et al. |
| 2018/0074870 A1 | 3/2018 | Park et al. |
| 2018/0075046 A1 | 3/2018 | Park et al. |
| 2018/0075099 A1 | 3/2018 | Park et al. |
| 2018/0075100 A1 | 3/2018 | Park et al. |
| 2018/0075107 A1 | 3/2018 | Park et al. |
| 2018/0075125 A1 | 3/2018 | Stiel et al. |
| 2018/0075163 A1* | 3/2018 | Park .................... G06F 16/24532 |
| 2018/0189389 A1 | 7/2018 | Baldini Soares et al. |
| 2018/0218522 A1 | 8/2018 | De Castro Alves et al. |

FOREIGN PATENT DOCUMENTS

| | | |
|---|---|---|
| JP | 2010108073 | 5/2010 |
| JP | 2011059967 | 3/2011 |
| WO | 2014089190 | 6/2014 |
| WO | 2015191120 | 12/2015 |
| WO | 2017070354 | 4/2017 |
| WO | 2018052907 | 3/2018 |
| WO | 2018052908 | 3/2018 |
| WO | 2018053338 | 3/2018 |
| WO | 2018053343 | 3/2018 |
| WO | 2018169429 | 9/2018 |
| WO | 2018169430 | 9/2018 |

OTHER PUBLICATIONS

Distributed Systems—Event Ordering in Multi-Stage Processing, Available Online at: http://cep4iot.blogspot.nl/2015/09/distributed-systems-event-ordering-in.html, Sep. 30, 2015, 2 pages.

MapReduce, Wikipedia, The Free Encyclopedia, Accessed from Internet on Oct. 17, 2016, 11 pages.

Oracle Fusion Middleware Developer's Guide for Oracle Event Processing 11g Release 1 (11.1.1.9), Oracle Corporation, Feb. 2015, 79 pages.

Pig (Programming Tool), Wikipedia, The Free Encyclopedia, Accessed from Internet on Oct. 17, 2016, 4 pages.

Spark SQL, DataFrames and Datasets Guide, Spark 2.0.0 Documentation, Available online at: http://spark.apache.org/SO/docs/2.0.0/sql-programming-guide.html, Sep. 2, 2016, 29 pages.

Spark Streaming Programming Guide, Spark 2.0.0 Documentation, Available online at: http://spark.apache.org:80/docs/2.0.0/streaming-programming-guide.html, Sep. 1, 2016, 34 pages.

U.S. Appl. No. 14/079,538, Final Office Action dated Feb. 27, 2019, 10 pages.

U.S. Appl. No. 14/079,538, Final Office Action dated Nov. 16, 2017, 26 pages.

U.S. Appl. No. 14/079,538, Final Office Action dated Jul. 27, 2016, 28 pages.

U.S. Appl. No. 14/079,538, Non-Final Office Action dated Jun. 20, 2018, 22 pages.

(56) References Cited

OTHER PUBLICATIONS

U.S. Appl. No. 14/079,538, Non-Final Office Action dated Mar. 31, 2017, 24 pages.
U.S. Appl. No. 14/079,538, Non-Final Office Action dated Oct. 22, 2015, 34 pages.
U.S. Appl. No. 14/302,031, Final Office Action dated Apr. 22, 2015, 23 pages.
U.S. Appl. No. 14/302,031, Non-Final Office Action dated Aug. 27, 2014, 19 pages.
U.S. Appl. No. 14/302,031, Notice of Allowance dated Nov. 3, 2015, 19 pages.
U.S. Appl. No. 14/610,971, Non-Final Office Action dated Dec. 19, 2016, 10 pages.
U.S. Appl. No. 14/610,971, Notice of Allowance dated Apr. 12, 2017, 11 pages.
U.S. Appl. No. 14/861,687, Non-Final Office Action dated Oct. 11, 2017, 10 pages.
U.S. Appl. No. 14/861,687, Notice of Allowance dated Jun. 6, 2018, 10 pages.
U.S. Appl. No. 14/866,512, Applicant Initiated Interview Summary dated Aug. 17, 2017, 3 pages.
U.S. Appl. No. 14/866,512, Final Office Action dated Sep. 13, 2017, 25 pages.
U.S. Appl. No. 14/866,512, Non-Final Office Action dated Apr. 10, 2017, 24 pages.
U.S. Appl. No. 14/866,512, Notice of Allowance dated Feb. 15, 2018, 5 pages.
U.S. Appl. No. 15/095,766, First Action Interview Pilot Program Pre-Interview Communication dated Feb. 28, 2017, 4 pages.
U.S. Appl. No. 15/700,862, Non-Final Office Action dated Nov. 9, 2018, 15 pages.
U.S. Appl. No. 15/700,862, Non-Final Office Action dated Jun. 10, 2019, 22 pages.
U.S. Appl. No. 15/706,329, Non-Final Office Action dated Nov. 13, 2019, 15 pages.
U.S. Appl. No. 15/706,407, Non-Final Office Action dated Nov. 8, 2019, 11 pages.
U.S. Appl. No. 15/936,037, Non-Final Office Action dated Jun. 6, 2018, 30 pages.
U.S. Appl. No. 15/936,037, Notice of Allowance dated Oct. 5, 2018, 5 pages.
Alves et al., Getting Started with Oracle Complex Event Processing 11g, (Chapters 1, 2, 4, 5, 6), Packet Publishing, Mar. 26, 2013, 340 pages.
Arasu et al., CQL: A language for Continuous Queries Over Streams and Relations, Lecture Notes in Computer Science, vol. 2921, 2004, pp. 1-19.
Arasu et al., The CQL Continuous Query Language: Semantic Foundations and Query Execution, The VLDB Journal, vol. 15, No. 2, Jul. 22, 2005, pp. 121-142.
Balkesen et al., Scalable Data Partitioning Techniques for Parallel Sliding Window Processing over Data Streams, 8th International Workshop on Data Management for Sensor Networks, Online Available at https://www.inf.ethz.ch/personal/cagri.balkesen/publications/dmsn2011.pdf, Aug. 29, 2011, pp. 1-6.
Barga et al., Coping with Variable Latency and Disorder in Distributed Event Streams, Proceedings of the 26th IEEE International Conference on Distributed Computing Systems Workshops, Jul. 4, 2006, 6 pages.
Bestehorn et al., Fault-tolerant Query Processing in Structured P2P-systems, Distributed and Parallel Databases, vol. 28, Issue 1, Aug. 2010, pp. 33-66.
Blumofe et al., An Analysis of Dag-Consistent Distributed Shared-Memory Algorithms, Proceedings of the Eighth Annual ACM Symposium on Parallel Algorithms and Architectures, Jun. 24-26, 1996, 12 pages.
Brito et al., Speculative Out-of-Order Event Processing with Software Transaction Memory, Proceedings of the Second International Conference on Distributed Event-Based Systems, Jul. 2008, pp. 265-275.
Chintapalli et al., Benchmarking Streaming Computation Engines: Storm, Flink and Spark Streaming, IEEE International Parallel and Distributed Processing Symposium Workshops (IPDPSW), May 23, 2016, pp. 1789-1792.
Chinese Application No. 201380063379.4, Office Action dated May 7, 2019, 10 pages (4 pages for the original document and 6 pages for the English translation).
Chinese Application No. 201380063379.4, Office Action dated Feb. 2, 2018, 13 pages (6 pages for the original document and 7 pages for the English translation).
Chinese Application No. 201380063379.4, Office Action dated Oct. 9, 2018, 7 pages (3 pages for the original document and 4 pages for the English translation).
Chinese Application No. 201580001992.2, Office Action dated Mar. 5, 2019, 21 pages (11 pages for the original document and 10 pages for the English translation).
Chinese Application No. 201680053838.4, Office Action dated May 29, 2019, 10 pages (5 pages for the original document and 6 pages for the English translation).
Chinese Application No. 201680053838.4, Office Action dated Jan. 16, 2019, 15 pages (7 pages for the original document and 8 pages for the English translation).
European Application No. 13815232.7, Office Action dated May 10, 2019, 5 pages.
European Application No. 13815232.7, Summons to Attend Oral Proceedings mailed on Aug. 8, 2019, 6 pages.
European Application No. 15708969.9, Office Action dated May 16, 2019, 5 pages.
European Application No. 16794796.9, Office Action dated Nov. 14, 2019, 6 pages.
European Application No. 19190843.3, Extended European Search Report dated Nov. 20, 2019, 9 pages.
Japanese Application No. 2015-545815, Notice of Decision to Grant dated Oct. 31, 2017, 6 pages (3 pages for the original document and 3 pages for the English translation).
Japanese Application No. 2016-521684, Notice of Decision to Grant dated May 14, 2019, 5 pages (3 pages for the original document and 2 pages for the English translation).
Japanese Application No. 2016-521684, Office Action dated Jan. 22, 2019, 6 pages (3 pages for the original document and 3 pages for the English translation).
Li et al., Event Stream Processing with Out-of-Order Data Arrival, 27th International Conference on Distributed Computing Systems Workshops, Jan. 1, 2007, 9 pages.
Mager et al., DistBack: A Low-Overhead Distributed Back-Up Architecture with Snapshot Support, 19th IEEE Workshop on Local & Metropolitan Area Networks (LANMAN), Apr. 10-12, 2013, 6 pages.
Masud et al., A Multi-Partition Multi-Chunk Ensemble Technique to Classify Concept-Drifting Data Streams, Advances in Knowledge Discovery and Data Mining, Available online at: https://www.utdallas.edu/~bhavani.thuraisingham/Publications/Conference-Papers/DM/C184_A_Multi-partition_Multi-chunk_Ensemble.pdf, Jul. 23, 2009, pp. 363-375.
Olston et al., Pig Latin: A Not-So-Foreign Language for Data Processing, SIGMOD'08, ACM 978-1-60558-102, Jun. 9-12, 2008, 12 pages.
OR, Understanding Your Apache Spark Application Through Visualization—The Databricks Blog, Available online at: https://databricks.com/blog/2015/06/22/understanding-your-sparkapplication-through-visualization.html, Jun. 22, 2015, 6 pages.
International Application No. PCT/RU2017/000135, International Preliminary Report on Patentability dated Sep. 26, 2019, 7 pages.
International Application No. PCT/RU2017/000135, International Search Report and Written Opinion dated Sep. 6, 2017, 11 pages.
International Application No. PCT/US2013/073086, International Preliminary Report on Patentability dated Jun. 18, 2015, 6 pages.
International Application No. PCT/US2013/073086, International Search Report and Written Opinion dated Mar. 14, 2014, 9 pages.
International Application No. PCT/US2015/016346, International Preliminary Report on Patentability dated Sep. 30, 2016, 6 pages.
International Application No. PCT/US2015/016346, International Search Report and Written Opinion dated May 4, 2015, 10 pages.

(56) References Cited

OTHER PUBLICATIONS

International Application No. PCT/US2015/016346, Written Opinion dated May 24, 2016, 5 pages.
International Application No. PCT/US2016/057924, International Preliminary Report on Patentability dated Jan. 16, 2018, 11 pages.
International Application No. PCT/US2016/057924, International Search Report and Written Opinion dated Jan. 17, 2017, 15 pages.
International Application No. PCT/US2016/057924, Written Opinion dated Oct. 26, 2017, 7 pages.
International Application No. PCT/US2016/057924, Written Opinion dated Sep. 27, 2017, 7 pages.
International Application No. PCT/US2017/051195, International Preliminary Report on Patentability dated Nov. 8, 2018, 9 pages.
International Application No. PCT/US2017/051195, International Search Report and Written Opinion dated Nov. 8, 2017, 14 pages.
International Application No. PCT/US2017/051195, Written Opinion of the International Preliminary Examining Authority dated Aug. 13, 2018, 5 pages.
International Application No. PCT/US2017/051196, International Preliminary Report on Patentability dated Mar. 28, 2019, 9 pages.
International Application No. PCT/US2017/051196, International Search Report and Written Opinion dated Nov. 7, 2017, 13 pages.
International Application No. PCT/US2017/051887, International Preliminary Report on Patentability dated Mar. 28, 2019, 8 pages.
International Application No. PCT/US2017/051887, International Search Report and Written Opinion dated Dec. 15, 2017, 12 pages.
International Application No. PCT/US2017/051897, International Preliminary Report on Patentability dated Mar. 28, 2019, 9 pages.
International Application No. PCT/US2017/051897, International Search Report and Written Opinion dated Dec. 15, 2017, 17 pages.
Sadana, Interactive Scatterplot for Tablets, AVI, Available Online at: https://vimeo.com/97798460, 2014, 7 pages.
Salmon et al., Design Principles of a Stream-Based Framework for Mobility Analysis, Geoinformatica, vol. 21, No. 2, Apr. 25, 2016, pp. 237-261.
Yang et al., Map-Reduce-Merge: Simplified Relational Data Processing on Large Clusters, SIGMOD'07, Jun. 12-14, 2007, pp. 1029-1040.
International Application No. PCT/RU2017/000136, "International Search Report and Written Opinion", dated Sep. 6, 2017, 10 pages.
International Application No. PCT/RU2017/000136, "International Preliminary Report on Patentability", dated Sep. 26, 2019, 7 pages.
U.S. Appl. No. 15/700,862, Notice of Allowance dated Jan. 30, 2020, 16 pages.
U.S. Appl. No. 15/706,329, Notice of Allowance dated Mar. 11, 2020, 10 pages.
U.S. Appl. No. 15/706,407, Notice of Allowance dated Apr. 2, 2020, 9 pages.
Debbabi et al., Controlling Self-Organising Software Applications with Archetypes, IEEE, Available online at: https://ieeexplore.ieee.org/stamp/stamp.jsp?arnumber=6394112, Sep. 2012, 10 pages.
Herrmannsdoerfer et al., Model-Level Simulation for COLA, IEEE, Available online at: https://dl.acm.org/doi/pdf/10.1109/MISE.2009.5069895?download=true, May 2009, pp. 38-43.
Kodase et al., Transforming Structural Model to Runtime Model of Embedded Software with Real-Time Constraints, IEEE, Available online at: https://ieeexplore.ieee.org/stamp/stamp.jsp?arnumber=1186690, 2003, pp. 6.
Wang et al., Early-Stage Performance Modeling and Its Application for Integrated Embedded Control Software Design, Available online at: https://dl.acm.org/doi/pdf/10.1145/974043.974061?download=true, Jan. 2004, pp. 110-114.
U.S. Appl. No. 14/079,538, Non-Final Office Action dated Apr. 7, 2020, 13 pages.
U.S. Appl. No. 15/700,784, Non-Final Office Action dated Apr. 7, 2020, 14 pages.
U.S. Appl. No. 15/700,914, Non-Final Office Action dated Jun. 1, 2020, 9 pages.
U.S. Appl. No. 15/701,019, Non-Final Office Action dated Jun. 15, 2020, 9 pages.
U.S. Appl. No. 15/706,226, Non-Final Office Action dated May 1, 2020, 48 pages.
U.S. Appl. No. 15/706,407, Final Office Action dated Apr. 2, 2020, 9 pages.
U.S. Appl. No. 15/706,407, Notice of Allowance dated Jun. 17, 2020, 8 pages.
U.S. Appl. No. 16/559,907, Non-Final Office Action dated Jul. 10, 2020, 27 pages.
U.S. Appl. No. 15/700,914, Final Office Action dated Oct. 27, 2020, 9 pages.
U.S. Appl. No. 15/700,784, Final Office Action dated Oct. 27, 2020, 14 pages.

\* cited by examiner

INTEGRATING LOGIC IN MICRO BATCH BASED EVENT PROCESSING SYSTEMS

CROSS-REFERENCE TO RELATED APPLICATIONS

The present application is a continuation of International Application No. PCT/RU2017/000136, filed Mar. 17, 2017, entitled "INTEGRATING LOGIC IN MICRO BATCH BASED EVENT PROCESSING SYSTEMS," the entire contents of which is herein incorporated by reference for all purposes. This application is also related to International Application No. PCT/RU2017/000135, filed Mar. 17, 2017, entitled "FRAMEWORK FOR THE DEPLOYMENT OF EVENT-BASED APPLICATIONS," the entire contents of which is incorporated herein by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Techniques are provided (e.g., a method, a system, non-transitory computer-readable medium storing code or instructions executable by one or more processors) for processing events of a continuous event stream. In an embodiment, a distributed event processing system is disclosed that can receive one or more continuous data streams, register a continuous query against the data streams, and continuously execute the query as new data appears in the streams. In certain embodiments, the distributed event processing system may be configured to deploy and execute applications (e.g., event processing applications) by distributing the execution of the application on a cluster of machines within the system.

In certain embodiments, the disclosed system may be configured to enable a user to write an application (e.g., an event processing application) using a set of logical rules. The logical rules may be expressed in the form of if-then-else rules within the application. By providing users with the ability to specify logical rules in an application, users can write applications that can identify and respond to complex patterns, look for events that meet specified criteria, alert other applications, or perform other functions that require immediate action based on quickly changing data without knowing how to write complex application code. By providing users with the ability to specify/define logical rules in an application, the disclosed system enables users to develop and modify an application with little or no assistance from a programmer.

In certain embodiments, the disclosed system may be configured to process the logical rules defined in an application by generating a DAG of transformations representing the logical rules and converting the DAG of transformations into a logical rules Resilient Distributed Dataset (RDD) DAG of transformations. The disclosed system may then be configured to process the events in an event batch against the RDD DAG of transformations to generate a set of output results for the user.

In certain embodiments, the distributed event processing system comprises a memory storing a plurality of instructions and one or more processors configured to access the memory. The processors are configured to receive, at a first computing device of a plurality of computing devices in the distributed event processing system, information that identifies an application. In an embodiment, the information may include a set of one or more logical rules to be applied to a continuous stream of events related to the application. The first computing device may be comprised in a cluster of computing nodes in the distributed event processing system and the cluster of computing nodes may comprise at least a subset of the plurality of computing devices in the distributed event processing system.

In certain embodiments, the processors are configured to generate a first set of transformations for the application. In an embodiment, the first set of transformations may represent a Directed Acyclic Graph (DAG) of transformations of the set of one or more logical rules. The processors are configured to receive a first batch of events from the continuous stream of events, convert the first batch of events into a first batch of event objects and process the first batch of event objects against the first set of transformations to generate a first set of output events related to the application. In certain embodiments, the processors are further configured to transmit the first set of output events to a user of the distributed event processing system.

In certain embodiments, the processors are further configured to create a Resilient Distributed Dataset (RDD) DAG of transformations of the set of one or more logical rules defined in the application, process the first batch of event objects against the RDD DAG of transformations to generate a first set of result objects, and convert the first set of result objects to the first set of output events related to the application. In certain examples, the RDD DAG of transformations comprise at least one of the set of one or more logical rules to be applied to at least the first batch of events, a tuple event type corresponding to the events in the first batch of events, and a Plain Old Java Object (POJO) event type corresponding to the events in the first batch of events.

In certain embodiments, the information that identifies an application further comprises a set of one or more continuous queries and the processors are configured to process the first batch of events against the set of one or more continuous queries to generate the first set of output events related to the application. In certain embodiments, the processors are configured to generate a second set of transformations for the application. The second set of transformations may represent a DAG of transformations of the set of one or more continuous queries defined in the application. The processors may be configured to process the first batch of events against the second set of transformations to generate the first set of output events related to the application.

In certain examples, the set of one or more logical rules may comprise a set of if-then rules related to one or more operations to be performed by the application. In certain examples, the information that identifies an application may also comprise at least one of a deployment type parameter that specifies a type of deployment of the application on the cluster of computing nodes in the distributed event processing system and one or more configuration parameters related to the application.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
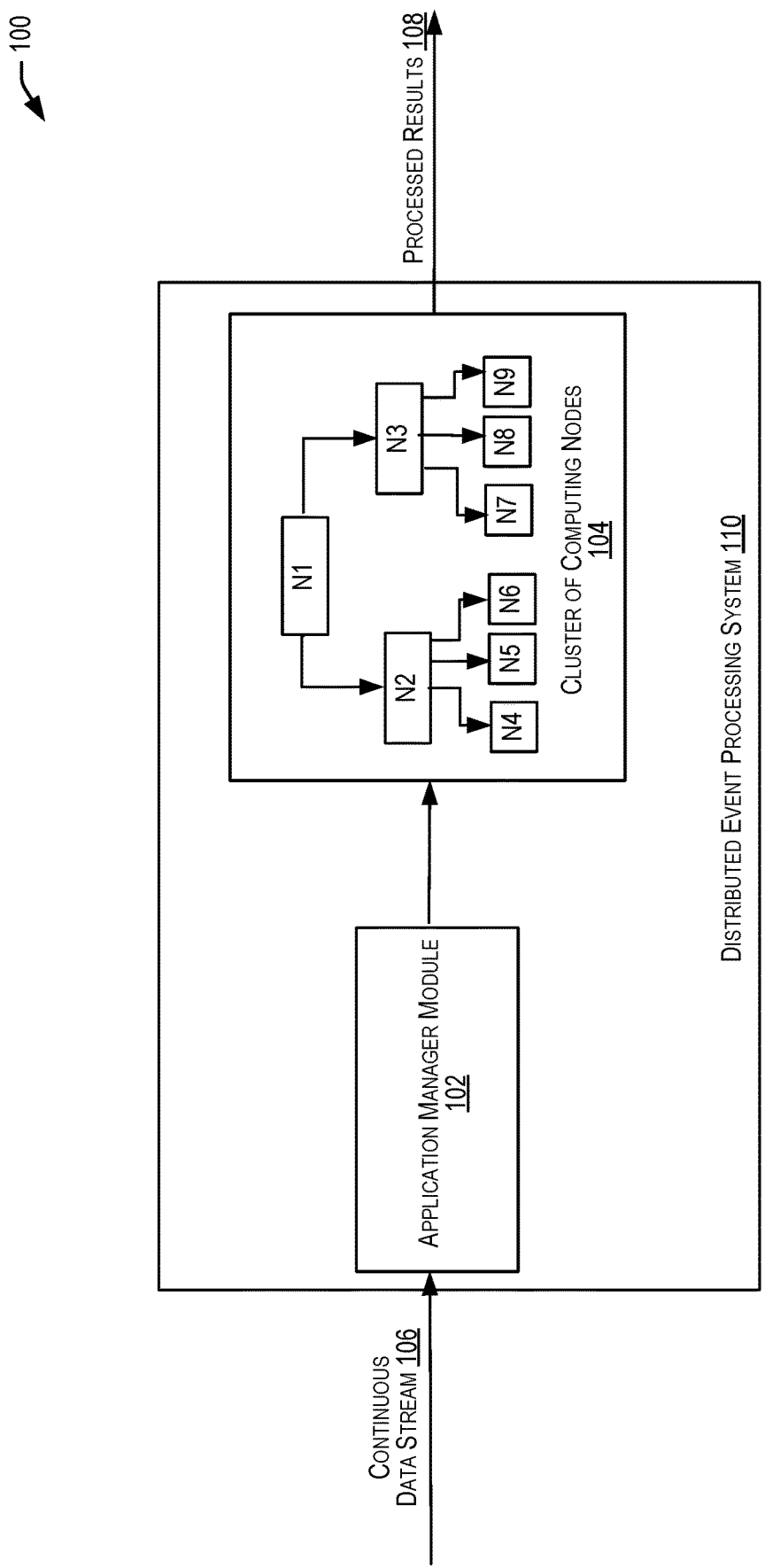
FIG. 1 is a simplified block diagram illustrating components of a distributed event processing system, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL), which allows applications to filter, query, and perform pattern-matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...

In the above stream, for stream element (<timestamp_N+1>, <ORCL,62>), the event is <ORCL,62> with attributes "stock_symbol" and "stock_value." The timestamp associated with the stream element is "timestamp_N+1." A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. In addition, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

Distributed Event Processing

In certain situations, users of an enterprise may wish to identify and respond to significant events that occur within the enterprise quickly so that they can take immediate action upon the identification of such events. For example, a user may wish to identify significant events that relate to sales orders that have crossed a threshold within the enterprise. In such a scenario, a user may submit one or more queries to a data store/data warehouse and wish to view the results of a query in less than a few seconds rather than in minutes or hours so that the user can take immediate action if an anomaly is detected. Real-time data processing and data analytics may be used by enterprises to process event streams in real-time for more reactive decision making and to take immediate action for those times when acting within seconds or minutes is significant.

In accordance with an embodiment of the present disclosure, a distributed event processing system is disclosed that can process or query very large quantities of data relatively quickly and in real-time using a combination of CEP and distributed event stream processing. The distributed event processing system can perform real-time processing of data streams by executing queries (e.g., CQL queries) against the data streams (e.g., live feeds) that are received continuously. The distributed event processing system can receive one or more continuous data streams, register a continuous query against the data streams, and continuously execute the query as new data appears in the streams. Since this type of continuous query is long-running, the distributed event processing system can provide a continuous stream of results to a user.

In certain embodiments, the disclosed distributed event processing system may be configured to deploy and execute applications (e.g., event processing applications) by distributing the execution of an application on a cluster of machines within the system. An event processing application described herein may include a set of rules that may be expressed in the form of continuous queries that are used to process input streams. A continuous query may comprise instructions (e.g., logic) that identify the processing to be performed for received events including what events are to be selected as notable events and output as results of the query processing. Continuous queries may typically perform filtering and aggregation functions to discover and extract notable events from the input event streams. An application can be configured to listen to one or more input event streams, execute logic (e.g., a query) for selecting one or more notable events from the one or more input event streams, and output the selected notable events via one or more output event streams.

For instance, an event processing application may comprise a word counting application that counts a quantity of references to a particular word within a set of input texts. Such an application can include, for example, continuous queries that read a set of texts and count the number of times that each word appears in each text. The input text may contain, for example, short messages received in the stream from an on-line application, such as Facebook® or Twitter®. As noted above, continuous queries may be configured using the CQL language. For instance, to specify a word-counting task/operation to be performed in the word counting streaming application, a user can write a CQL query that can take a form such as: FROM location GROUP BY word SELECT count. Such a query can gather all of the sentences from the specified location, group the unique words from those sentences into distinct groups, and then count the quantity of words in each group.

By distributing the execution of the application on a cluster of machines, the disclosed distributed event processing system may be configured to provide results pertaining to the execution of the application quickly and in real-time to a user. The distributed event processing system may be configured to partition the data pertaining to the application into separate computing nodes, and each computing node can be maintained as a separate file on a separate computing machine. Each such machine can be configured to execute a query in the application in parallel with the other machines relative to the data maintained on that machine.

In certain embodiments, the disclosed distributed event processing system may be configured to reduce delays associated with application deployment and execution, for example, when updates to an application are received. For instance, continuing with the example of the word counting application described above, a user building the application may wish to determine, in addition to the word count, the distribution of letters in the most popular words received in the continuous input stream of texts. Thus, the user may update the application to include a query to filter out all the words that appear fewer times than the threshold and another query to count the number of times that each letter occurs for the remaining words in the text.

When an update to an application is thus received, the disclosed distributed event processing system, in certain embodiments, is configured to identify the location of the computing node in the cluster of machines in the distributed event processing system where the application is executing and identify a portion of the topology of the application that corresponds to the update. The distributed event processing system may be configured to identify the updated portion of the topology of the application that includes the additional queries added by the user and execute only those queries, instead of re-deploying or re-executing the entire application. Thus, the distributed event processing system reduces delays associated with application deployment and execution when updates to an application are received. Thus, a user of the application can view results pertaining to an updated application quickly without experiencing the typical deployment and execution delays that occur when updates to an application are made.

Processing Logical Rules in Event Processing Applications

In general, the successful growth of an enterprise depends on the ability of leaders of the enterprise to understand, justify, and rapidly change their decision making process in accordance with evolving needs and priorities. As such, it is desirable for leaders to develop applications that can incorporate policies and key decisions of the enterprise. In accordance with an embodiment of the present disclosure, a framework is disclosed by which users (e.g., leaders, end users, and so on) of an enterprise can develop applications (e.g., event processing applications) that include information related to policies of an enterprise. For instance, a user may wish to write a car rental application that includes information related to policies on the age limit of a driver who can rent a car, a past driving record of the driver, and so on. In another scenario, a user may wish to write a loan application that specifies a policy on the loan income limit that may be borrowed by customers of the institution/enterprise. Specifying such policies typically involves writing complex application code in the application. However, users (e.g., leaders, end-users) who wish to build applications may not always have the knowledge of how to write this complex application code.

In certain embodiments, the disclosed distributed event processing system may be configured to provide a framework that enables technical and non-technical users of an enterprise the ability to define complex logic while building applications. In an embodiment, such logic may be specified in the form of a set of logical rules that can be expressed in the form of if-then-else rules within an application. For instance, a user may specify a logical rule related to a car rental policy in a car rental application by specifying an if-then rule of the form: If Driver age <21, then modify the status of the Driver's Rental Application to 'DECLINED.' As another example, a user could specify a logical rule about the minimum loan income that may be borrowed by a customer of the enterprise in a loan application as follows: If the customer's annual income <$10000, then, decline the customer's loan application.

By thus providing users with the ability to specify logical rules in an application, the disclosed system enables users with the ability to write applications that can identify and respond to complex patterns, look for events that meet specified criteria, alert other applications, or perform other functions that require immediate action based on quickly changing data without having the knowledge of writing complex application code. Additionally, by providing users with the ability to specify logical rules in an application, the disclosed system enables users to modify applications with little or no assistance from a programmer.

In certain embodiments, the disclosed system may be configured to enable a user to write applications using a set of logical rules. The disclosed system may be configured to receive a continuous stream of data, process the application against events in the continuous data stream, generate results of the processing, and output the results of the processing to the user. In certain embodiments, the disclosed system may be configured to process the logical rules defined in an application by generating a DAG of transformations representing the logical rules and converting the DAG of transformations into a logical rules Resilient Distributed Dataset (RDD) DAG of transformations. The disclosed system may then be configured to process the events in an event batch against the RDD DAG of transformations to generate a set of output results for the user.

In certain embodiments, the disclosed system may be configured to enable a user to write applications using a combination of logical rules and continuous queries. The disclosed system may be configured to process the logical rules and continuous queries defined in the application against the events in an event batch by generating a DAG of transformations that represent the continuous queries in the application and a separate DAG of transformations that represent the logical rules in the application. The disclosed system may be configured to convert the DAG of transformations representing the continuous queries into a CQL RDD DAG of transformations. The disclosed system may be configured to convert the DAG of transformations representing the logical rules into a logical rules RDD DAG of transformations. The disclosed system may then be configured to process events in an event batch against the RDD DAGs of transformations to generate a set of results for the user. In certain embodiments, the disclosed system may be configured to display the set of results to a user of the system.

The techniques described above may be implemented in a number of ways and in a number of contexts. Several example implementations and contexts are provided with reference to FIGS. 1-16 below which describe additional details of the manner in which the disclosed distributed event processing system may perform operations related to the deployment, processing, and execution of event processing applications.

FIG. 1 is a simplified block diagram 100 illustrating the components of a distributed event processing system 110, in accordance with an embodiment of the present disclosure. The embodiment shown in FIG. 1 is one example of a distributed event processing system that may incorporate an embodiment of the present disclosure. In some other embodiments, system 110 may have more or fewer components than shown in FIG. 1, may combine two or more components, or may have a different configuration or arrangement of components. System 110 can be any type of computing device, such as, but not limited to, a mobile, desktop, thin-client, and/or cloud computing device, a server, or any other data processing system.

In some examples, the distributed event processing system 110 may be made up of pre-integrated and optimized combinations of software resources, hardware resources, networking resources, and other resources. Hardware resources may include, without limitation, servers, data storage devices, servers, printers, or the like. Software resources may include, without limitation, a computing program, an application (e.g., cloud-based applications, enterprise applications, or any other applications), a computer-program product (e.g., software), a service (e.g., cloud-based services), or the like. Data resources may include, without limitation, any accessible data objects such as a file (e.g., a networked file or directory information), a database, and the like.

In certain embodiments, the distributed event processing system 110 may be capable of receiving a continuous stream of data 106, registering an application against the continuous stream of data and continuously executing the queries in the application to process the data as they appear in the stream. In an embodiment, the distributed event processing system 110 may include an application manager module 102 and a cluster of computing nodes 104. The application manager module 102 may be configured to deploy one or more applications (e.g., an event processing application) for execution by computing nodes in the cluster of computing nodes 104. As noted above, by distributing the deployment of the application on a cluster of machines/nodes, the distributed event processing system 110 may be configured to provide results pertaining to the execution of the application quickly and in real-time to a user. The distributed event processing system 110 may be configured to continuously execute the application against the continuous stream of data (or a batch of events) 106 and continuously output the results 108 of the processing to a user of the distributed event processing system. Additional operations performed by the distributed event processing system 100 are described in detail with reference to FIGS. 3-9 below.

Figure 2:
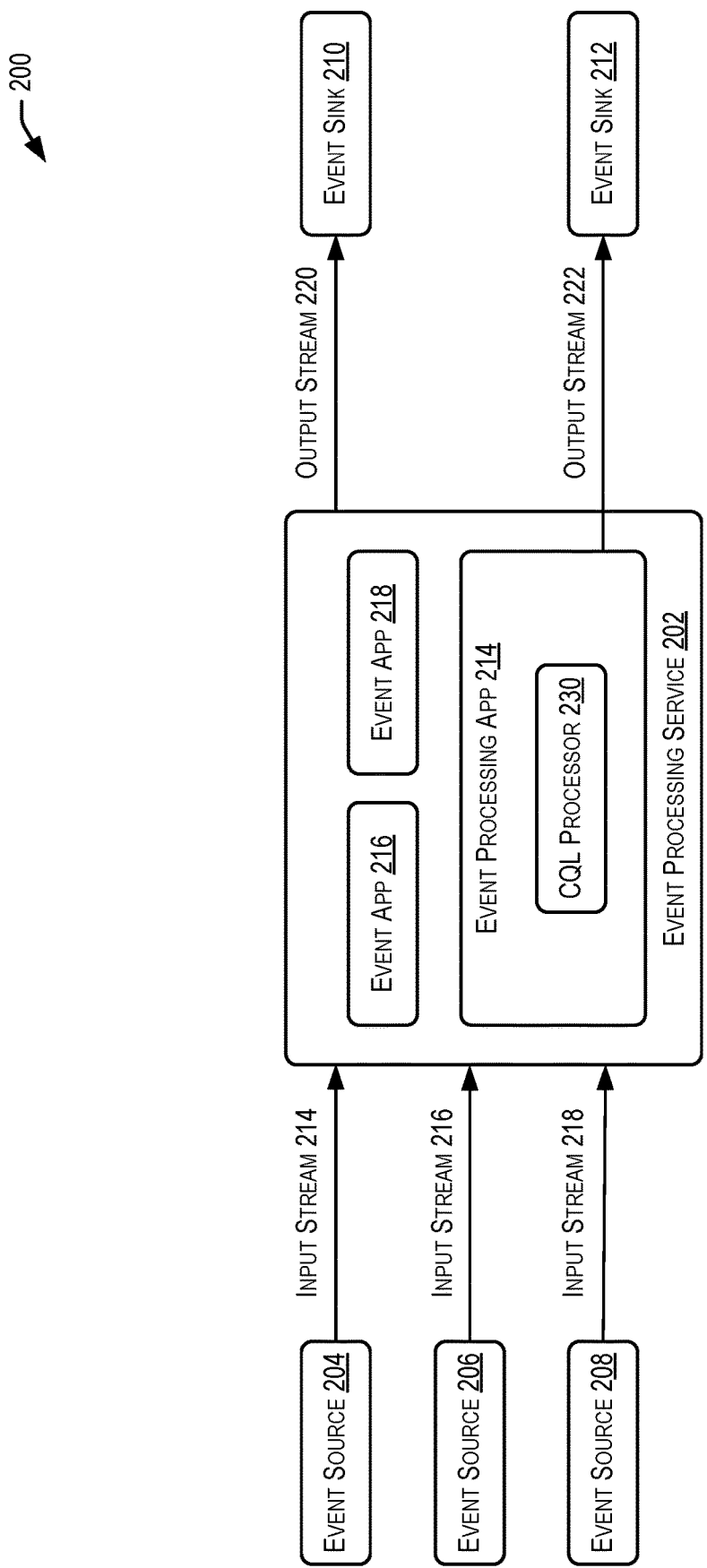
FIG. 2 is a simplified high level diagram of an event processing system 200 that may incorporate an embodiment of the present disclosure.

FIG. 2 depicts a simplified high level diagram of an event processing system 200 that may incorporate an embodiment of the present disclosure. Event processing system 200 may comprise one or more event sources (204, 206, 208), an event processing service (EPS) 202 (also referred to as CQ Service 202) that is configured to provide an environment for processing event streams, and one or more event sinks (210, 212). The event sources generate event streams that are received by EPS 202. EPS 202 may receive one or more event streams from one or more event sources. For example, as shown in FIG. 2, EPS 202 receives a first input event stream 214 from event source 204, a second input event stream 216 from event source 206, and a third event stream 218 from event source 208. One or more event processing applications (214, 216, and 218) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (210, 212) in the form of one or more output event streams. For example, in FIG. 2, EPS 202 outputs a first output event stream 220 to event sink 210, and a second output event stream 222 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 214. As shown in FIG. 2, event processing application 214 is configured to listen to input event stream 218, execute a continuous query 230 comprising logic for selecting one or more notable events from input event 218, and output the selected notable events via output event stream 222 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 214 in FIG. 1 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real-time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or logic for selection of events.

It should be appreciated that system 200 depicted in FIG. 2 may have other components than those depicted in FIG. 2. Further, the embodiment shown in FIG. 2 is only one example of a system that may incorporate an embodiment of the present disclosure. In some other embodiments, system 200 may have more or fewer components than shown in FIG. 2, may combine two or more components, or may have a different configuration or arrangement of components.

System 200 can be of various types including a service provider computer, a personal computer, a portable device (e.g., a mobile telephone or device), a workstation, a network computer, a mainframe, a kiosk, a server, or any other data processing system. In some embodiments, system 200 may be configured as a distributed event processing system as will be discussed in detail in FIGS. 3-9. In some other embodiments, and as described in FIG. 12, system 200 may be configured as a distributed system where one or more components of 200 are distributed across one or more networks in the cloud.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3:
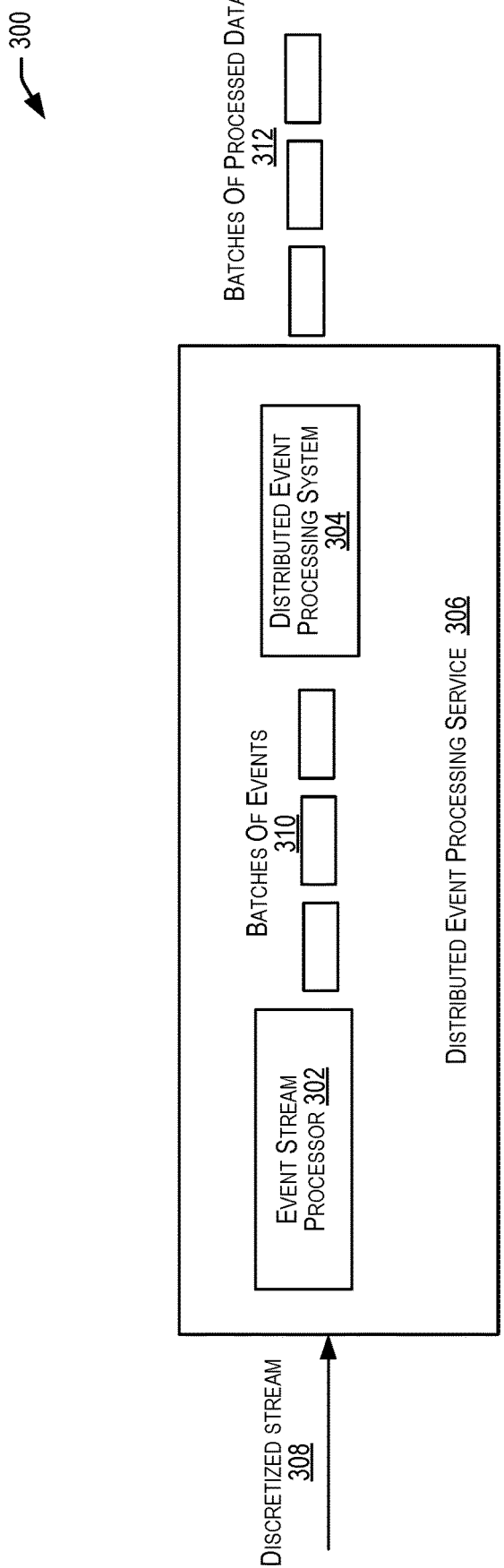
FIG. 3 is a simplified block diagram illustrating the components of a distributed event processing service that is configured to provide an environment for processing event streams, in accordance with an embodiment of the present disclosure.

FIG. 3 is a simplified block diagram 300 illustrating the components of a distributed event processing service 306 that is configured to provide an environment for processing event streams, in accordance with an embodiment of the present disclosure. It should be appreciated that the service 306 is one example of a distributed event processing service that may incorporate an embodiment of the present disclosure. In some other embodiments, the service 306 may have more or fewer components than shown in FIG. 3, may combine two or more components, or may have a different configuration or arrangement of components. In an embodiment, the service 306 may be configured as part of an integrated, distributed computing environment for processing event streams. The service 306 may include a plurality of computing devices, arranged in a cluster, as a server farm, or as individual servers not associated with one another. These servers may be configured to perform or otherwise host features described herein including, but not limited to distributed event processing, described herein.

In certain embodiments, the distributed event processing service 306 may include an event stream processor 302 and a distributed event processing system 304. The event stream processor 302 may be configured to receive one or more event streams 308 from one or more event sources (e.g., 204, 206, 208 as described in FIG. 2) and discretize the event stream into batches of events 310 for subsequent processing by the distributed event processing system 304. For example, the event stream processor 302 may be configured to capture the event streams in short time windows (e.g., one second duration windows) and computations may be performed by the distributed event processing system 304 over each batch of events. In an embodiment, the event stream processor 302 may be configured to represent the continuous event stream as a discretized stream (referred to herein as a DStream) of one or more batches of events. Each batch of events may internally be represented by the event stream processor 302 as a Resilient Distributed Dataset (RDD), which is a snapshot of all the input stream of data ingested during a specified time period. Thus, in certain embodiments, the event stream processor 302 may be configured to structure the stream of input data as a sequence of RDDs which may be subsequently distributed and stored in the distributed event processing system 304. The RDDs represent an immutable, partitioned collection of elements that can be executed on in parallel in the distributed event processing system 304.

In some embodiments, the distributed event processing system 304 may comprise a cluster of computing nodes configured to execute tasks to process the batches of events and output the results 312 of the processing (i.e., batches of processed data) to a user of the distributed event processing system. In an embodiment, the distributed event processing service 300 may be configured to provide a real-time streaming platform (e.g., by using the Spark Streaming framework from Apache®) to perform the distributed and real-time processing of continuous streams of data and the deployment of event processing applications. Additional operations performed by the distributed event processing system 304 are described in detail in relation to FIGS. 4A and 4B discussed below.

Figure 4A:
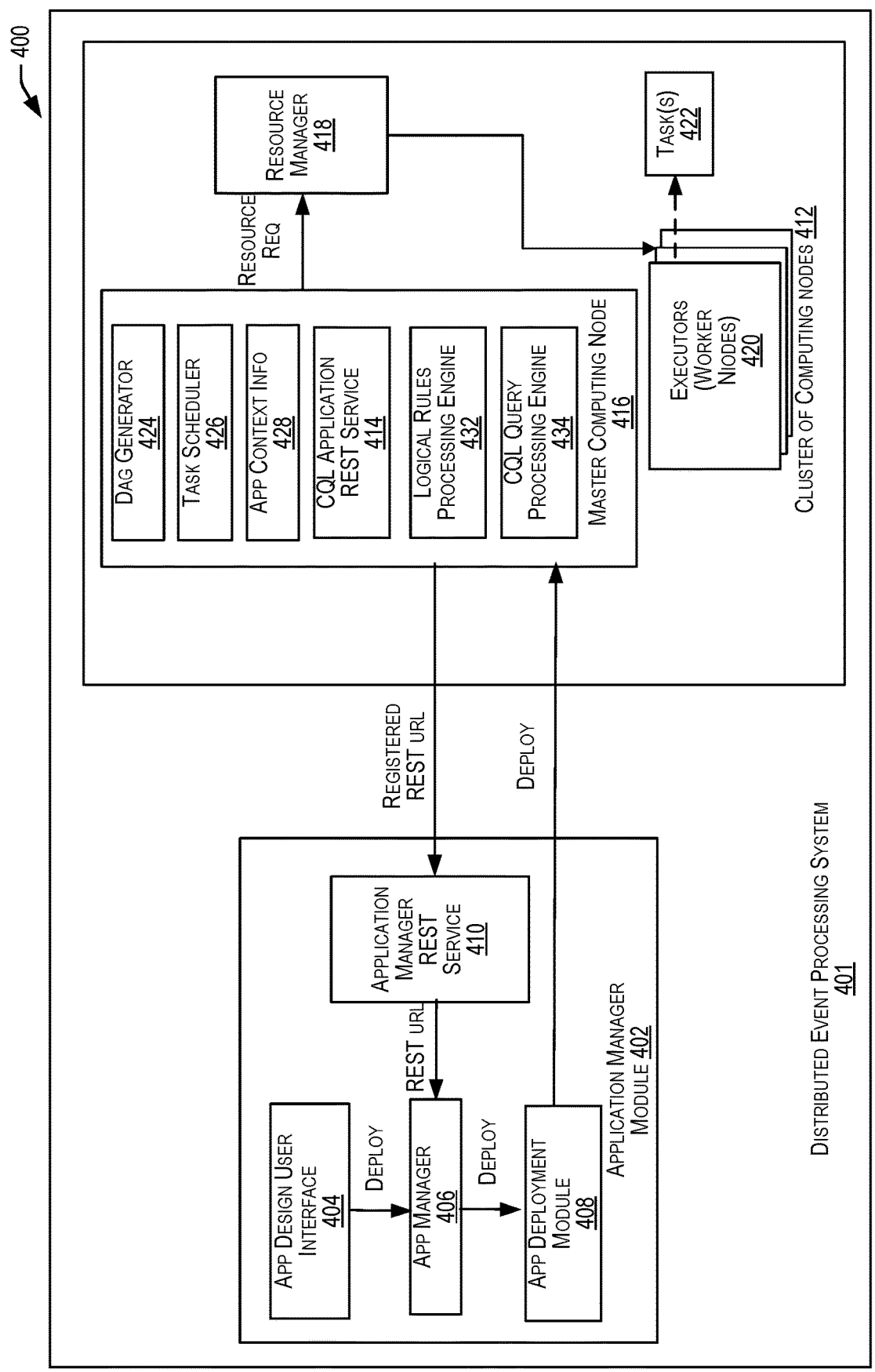
FIG. 4A is a simplified block diagram illustrating the components of a distributed event processing system, in accordance with an embodiment of the present disclosure.

FIG. 4A is a simplified block diagram 400 illustrating the components of a distributed event processing system, in accordance with an embodiment of the present disclosure. The distributed event processing system 401 may be the same as or similar to the distributed event processing systems 100 or 304 described in FIGS. 1 and 3 above. The embodiment shown in FIG. 4A is one example of a distributed event processing system that may incorporate an embodiment of the disclosure. In other embodiments, the distributed event processing engine may have more or fewer components than shown in FIG. 4A, may combine two or more components, or may have a different configuration or arrangement of components. These components may be implemented in hardware, firmware, software, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.). The embodiment shown in FIG. 4A is thus one example of a distributed event processing engine for implementing an embodiment system and is not intended to be limiting.

Figure 5:
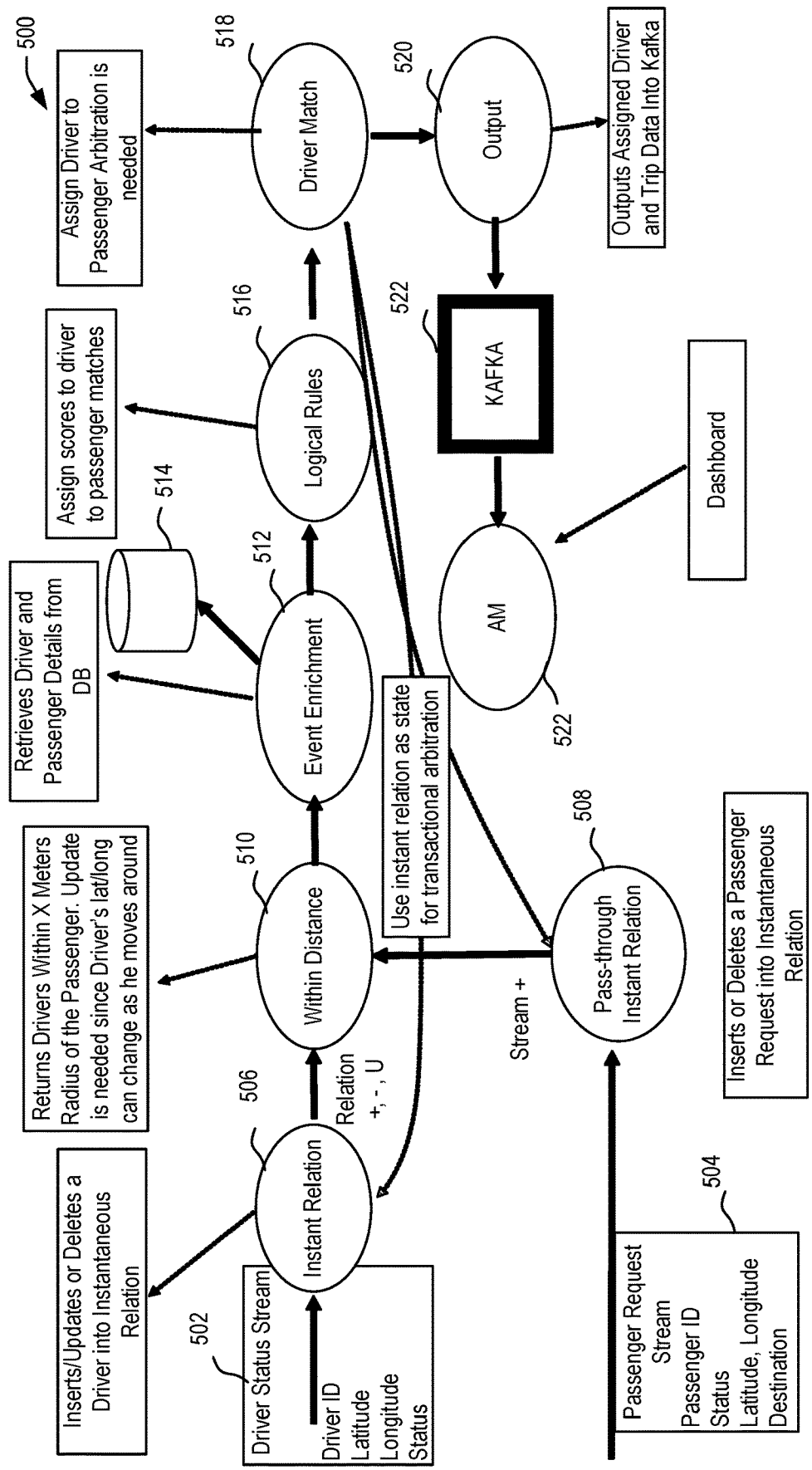
FIG. 5 is a high level overview of the structure of an exemplary application 500 built by a user of the distributed event processing system, in accordance with an embodiment of the present disclosure.

In certain embodiments, the distributed event processing system 401 may be capable of receiving one or more batches of events (for e.g., from an event processing service 202 as described in FIG. 2 or an event stream processor 302 as described in FIG. 3), registering an application against the batches of events and continuously executing the application to process the batches of events as they are received in the stream. In an embodiment, the distributed event processing system 401 may include an application manager module 402 and a cluster of computing nodes 412. The application manager module 402 may be configured to deploy one or more applications (e.g., an event processing application) for processing and execution by the computing nodes in the cluster of computing nodes 412. An application as used herein may refer to a computer program (e.g., built by a user) of the distributed event processing system. In certain embodiments, an application may comprise a combination of a set of one or more logical rules and a set of one or more continuous queries. One example application built by a user of the distributed event processing system is illustrated in FIG. 5 below.

In certain embodiments, the application manager module 402 may include an application design user interface 404, an application manager 406, an application deployment module 408, and an application manager REST Service 410. These components may be implemented in hardware, firmware, software, or combinations thereof. The application design user interface 404 may provide an interface (e.g., a graphical user interface) for a user of the distributed event processing system to generate/build an application. For instance, and as noted above, a user may build an application using a combination of a set of logical rules and/or a set of continuous queries (e.g., using the CQL language) to process the events received via a continuous data stream.

In certain embodiments, the application manager 406 may be configured to receive information that identifies an application from a user via the application design user interface 404. Information that identifies an application may include, in an embodiment, a set of logical rules that may be applied to process a continuous stream of events. For instance, a user may wish to build a 'ride sharing service' application (described in detail in FIG. 5 below) that determines a 'best driver match' for a passenger who wishes to reach a particular destination. Such an application may be built, for instance, using one or more logical rules to determine a 'driver score' for a driver based on information associated with the driver. For instance, a 'driver score' may be determined based on defining one or more driver match rules. The driver match rules may, for example, in an embodiment, relate to the distance of the driver's car from the current location of the passenger, the driver's rating information, the driver's gender, a past driving history of the driver, and so on. For example, a user may specify or express these driver match rules in the form of a set of logical rules (expressed as a set of if-then rules) within the application as follows: If the driver is at a distance of less than 5 miles from the current location of the customer, and if the driver's rating is high, and if the driver is the same gender as the passenger, then assign the driver's score as 'high.'

In certain, embodiments, and as noted above, information that identifies an application may also include a set of one or more continuous queries. For instance, continuing with the example of the 'fide sharing service' application described above, prior to determining the 'driver score,' the user may wish to identify a set of drivers who are within a vicinity/area (e.g., within an 'x' meter radius) of the passenger who requested the cab service. Or, for example, the user may wish to determine a count of the number of cars (events) that pass by a certain freeway every hour that are within the vicinity of the passenger's location. Information related to the application may thus include, a continuous query that can count the number of cars passing by the freeway every hour. Such a continuous query may be expressed, in an example, as follows: Select count ( ) from carStream [range 1 hour] group by freewayId, where freewayID indicates a particular lane on the freeway.

In certain embodiments, information that identifies an application may also include application parameters associated with the application. Application parameters may include, for instance, a deployment type parameter that specifies a type of deployment (e.g., 'cluster mode') of the application on the cluster of nodes 412. Additional application parameters may include parameters related to runtime configuration of application (e.g., the number of executors to use, parallelism parameters, the size of memory, the high availability parameters, and so on).

Upon receiving the information related to the application via the application design user interface 404 as discussed above, in certain embodiments, the application manager 406 then determines whether the application needs to be deployed. If the application needs to be deployed, the application manager 406 transmits an instruction to the application deployment module 408 which then transmits an instruction to the cluster of computing nodes 412 to deploy the application on the cluster.

Upon receiving the instruction from the application manager module 402, the cluster of computing nodes 412 deploys the application to a computing node on the cluster of computing nodes 412. In certain embodiments, when the application is deployed to a computing node on the cluster of nodes, the application is configured to run a service to receive requests from the application manager 406 in the application manager module 402. In certain embodiments, a CQL Representational State Transfer (REST) service 414 can be used to provide such a service. In an embodiment, the CQL Application REST Service 414 is part of the master computing node 416. In such an embodiment, when the application is deployed to a computing node (e.g., 416) on the cluster of nodes, the application transmits information such as the REST service URL of the CQL Application REST Service 414 to determine the location (i.e., the location of the computing node) on the cluster of computing nodes 412 where it is executing/deployed at. For example, the application may be configured to transmit a request to the REST service 414 via a REST Application Programming Interface (API) associated with the computing node that it is executing at.

In some examples, and as noted above, the CQL application REST service 414 may be a service located on the master computing node 416 in the cluster of computing nodes 412 that enables secure interactions with an application by allowing the application to communicate requests to it via a REST interface. When the application launches and the CQL application REST service 414 starts within the application, the CQL application REST service 414 may be configured to identify the location of the computing node (e.g., 416) in the cluster of computing nodes 412 that the application is deployed at and transmit a REST URL (that indicates the location of the computing node) to the application. The computing node 416 then transmits the REST URL of the CQL application REST service 414 to a REST service (e.g., an application manager REST service 410) associated with the application manager module 402. In certain embodiments, the REST URL of the application manager REST service 410 can be configured as part of the application runtime configuration. In certain embodiments, the application manager 406 may be configured to store the REST URL associated with the application.

As will be discussed in FIG. 4B below, by storing the REST URL, the application manager 406 can identify the location (i.e., the computing node 416) on the cluster of computing nodes 412 that the application is deployed at. Thus, when a user wishes to make an update to an application (e.g., via the application design user interface 404), the application manager 406 can identify, based on the stored URL, that the application is an application that has already been deployed on a computing node on the cluster of computing nodes. When an update is received, the computing node (e.g., 416) on the cluster of computing nodes 412 can identify only the updated portion of the application and execute only the updated portion of the application. Since the computing node does not have to re-deploy and re-execute the entire application when the update to the application is received, the user can achieve faster turn-around time and is able to view results associated with the application very quickly.

In certain embodiments, the application deployed on the computing node 416 in the cluster of computing nodes 412 may be viewed as an independent process executing on the cluster of computing nodes 412. In some examples, the computing node 416 may be identified as a master computing node 416 which stores an 'application context' of the application. The 'application context' may include, for instance, the application's content such as the application's topology, scheduling information, application parameters, and the like.

In certain embodiments, the master computing node 416 may also be referred to as the 'driver program' or the application master that runs/executes the application. The driver program may be defined as a process that runs the main( ) function of the application and creates the 'application context' for the application. The driver program may be responsible for both driving the application and requesting resources from the resource manager 418. The resource manager 418 may be a service that acquires resources for the computing nodes on the cluster of computing nodes 418 to execute the application. To run/execute the application on the cluster, the master computing node 416 connects to the resource manager 418 which then allocates resources for the application. Once connected, the master computing node 416 acquires one or more executors on one or more computing nodes (also known as worker nodes 420) in the cluster. The executors are processes that run computations and store data for the application. The master computing node 416 sends application code (for example, defined by a JAR file) to the executors. Based on the transformations and actions defined in the application, the master computing node 416 may send tasks to the executors.

In certain embodiments, the master computing node 416 may include a DAG generator 424, a task scheduler 426, application context information 428, a logical rules processing engine 432, and a CQL query processing engine 434. In some examples, an application may be represented as a set of actions or transformations to be performed on a particular data set (e.g., an event batch). For instance, an application may be represented as a "topology" in the shape of a DAG of operations or transformations. In an embodiment, the DAG generator 424 may represent an application as consisting of a number of stages and generate a DAG of transformations for each stage to be executed by the worker nodes 420 in the cluster of computing nodes 412. Each stage may contain a set of tasks to be run on the worker nodes 420. The task scheduler 426 may then schedule the execution of these tasks. The application context information 428 may be configured to store the 'application context' related to the application. As noted above, the 'application context' can include information about the application such as the application's topology, scheduling information, application parameters, and the like.

Figure 6:
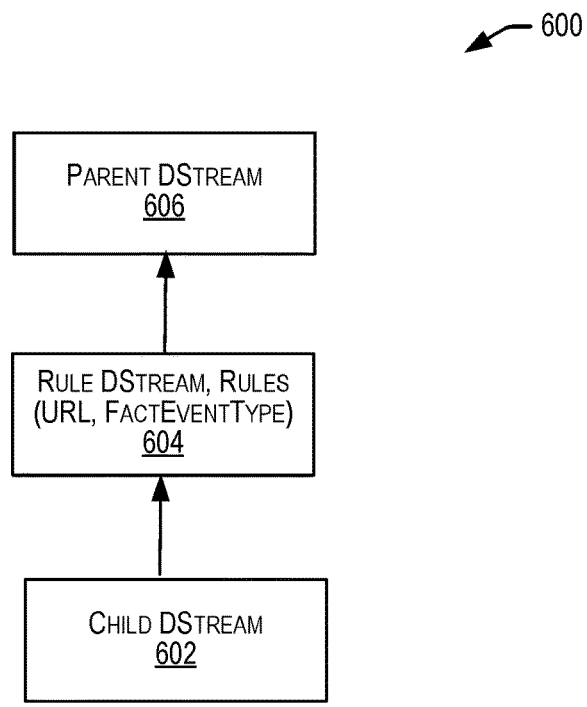
FIG. 6 illustrates an exemplary Directly Acyclic Graph (DAG) of transformations generated by the logic rules processing engine to process a set of logic rules defined in the application, in accordance with an embodiment of the present disclosure.
Figure 7:
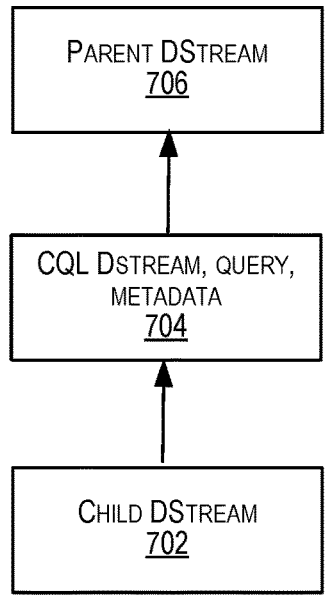
FIG. 7 illustrates an exemplary DAG of transformations generated by a Continuous Query Language (CQL) Query Processing Engine to process a set of continuous queries (e.g., CQL queries) defined in the application, in accordance with an embodiment of the present disclosure.

In certain embodiments, when the distributed event processing system 401 receives a batch of events from the continuous stream of events, the master computing node 416 (that is executing the application) invokes the application context 428 to retrieve the set of operations to be performed by the application. As noted above, these set of operations may include a set of instructions represented in the form of logical rules and/or a set of continuous queries in the application. When the application context is thus invoked, the DAG generator 424 generates a DAG of transformations that represent the set of operations defined in the application. For instance, if the application comprises a combination of logical rules and continuous queries, the DAG generator 424 may be configured to generate a set of transformations to represent the set of logical rules defined in the application and a separate set of transformations to represent the set of CQL queries defined in the application. For purposes of this disclosure, the set of transformations that represent the set of logical rules are referred to as a logical rules DStream DAG of transformations and the set of transformations represent the set of CQL queries are referred to as a CQL DStream DAG of transformations. FIG. 6 is an example illustration of a logical rules DStream DAG of transformations generated for an application. FIG. 7 is an exemplary illustration of a CQL DStream DAG of transformations generated for an application.

In certain embodiments, the logical rules processing engine 432 may be configured to process a batch of events received via the continuous event stream against the set of transformations (e.g., the logical rules DStream DAG of transformations and the CQL DStream DAG of transformations) defined for the application, and generate a set of results of the processing for transmission to a user. In certain embodiments, the logical rules processing engine 432 may be configured to perform additional operations to process a batch of events received via the continuous event stream against the logical rules defined in the application. For instance, this processing may involve, converting, by the logical rules processing engine 432, the logical rules DStream DAG of transformations into a logical rules RDD DAG of transformations and then processing the batch of events against the logical rules RDD DAG of transformations to generate a set of results for the user. Additional operations performed by the logical rules processing engine 432 to process the logical rules comprises in an application are discussed in detail in relation to FIGS. 8-10 below.

The above discussion described a set of operations performed by the distributed event processing system 401 during the initial deployment and execution of the application on the cluster of computing nodes 412. In certain embodiments, the distributed event processing system 400 may also be configured to receive updates to an application, process the updated application against a continuous stream of data (or alternatively a batch of events) and continuously generate updated results to a user. In an embodiment, and as will be described in detail in FIG. 4B, the distributed event processing system 401 may be configured to execute the updated application without re-deploying the application on the cluster of nodes, and provide the updated results to the user with reduced turn-around time and reduced delay.

Figure 4B:
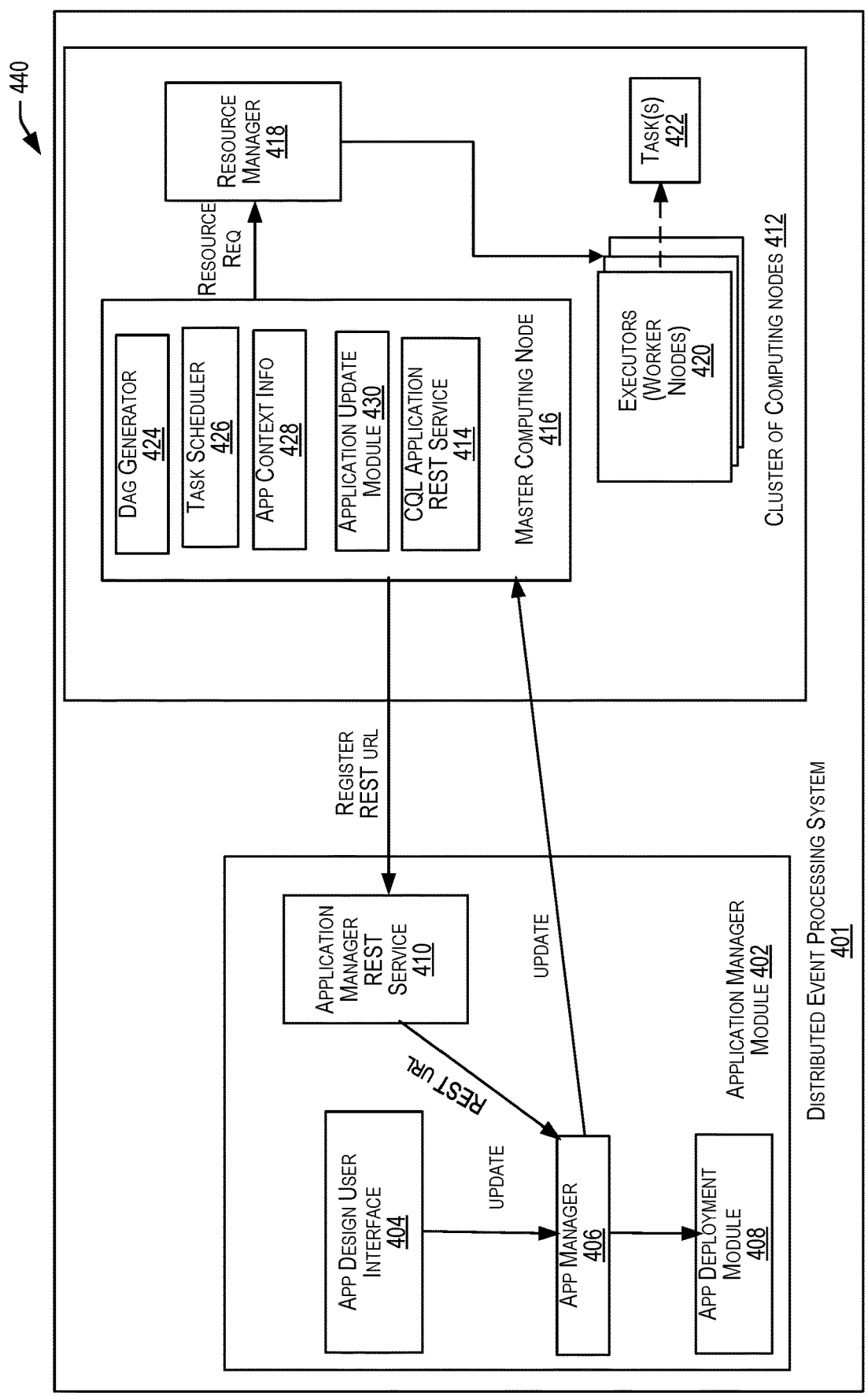
FIG. 4B is a simplified block diagram illustrating the operations performed by the distributed event processing system when an update to an application is received, in accordance with an embodiment of the present disclosure.

FIG. 4B is a simplified block diagram 440 illustrating the operations performed by the distributed event processing system 401 when an update to an application is received, in accordance with an embodiment of the present disclosure. The distributed event processing system 401 may be the same as or similar to the distributed event processing engine described in FIG. 4A. As noted above, in certain embodiments, the distributed event processing system 401 may be configured to receive an update to an application. For instance, the application manager 406 may be configured to receive an update to an application from a user via the application design user interface 404. For example, continuing with the 'ride sharing service' application described above, the user may wish to update the application to identify a set of 'male' drivers who are within a vicinity/area (e.g., within an 'x' meter radius) of the passenger who requested the ride service. In such a case, the user may update the application to include a CQL query that identifies the 'male' drivers in the list of drivers.

When the application manager 406 receives the updated application, it may determine, based on the stored REST URL, that the application is already deployed on a computing node in the cluster of computing nodes 412 and determine, based on the REST URL, the location of the computing node on the cluster of computing node 412 that the application is executing at. The application manger 406 may then be configured to transmit the update to the CQL application REST service 414 on the cluster of computing nodes 412. In an embodiment, the application manager 406 may be configured to transmit a common runtime application model that consists of the updated application to the CQL application REST service 414. The CQL application REST service 414 may then be configured to transmit the updated application to the master computing node 416.

In certain embodiments, the master computing node 416 may include an application update module 430. The application update module 430 may be configured to receive the update, identify the portion of the DAG of the application that corresponds to the update, generate a new/updated DAG for the application and execute the updated DAG. Thus, by executing only the updated DAG of the application, the distributed event processing engine 402 avoids re-deploying and re-executing the entire application each time an update to an application is received.

Figure 8:
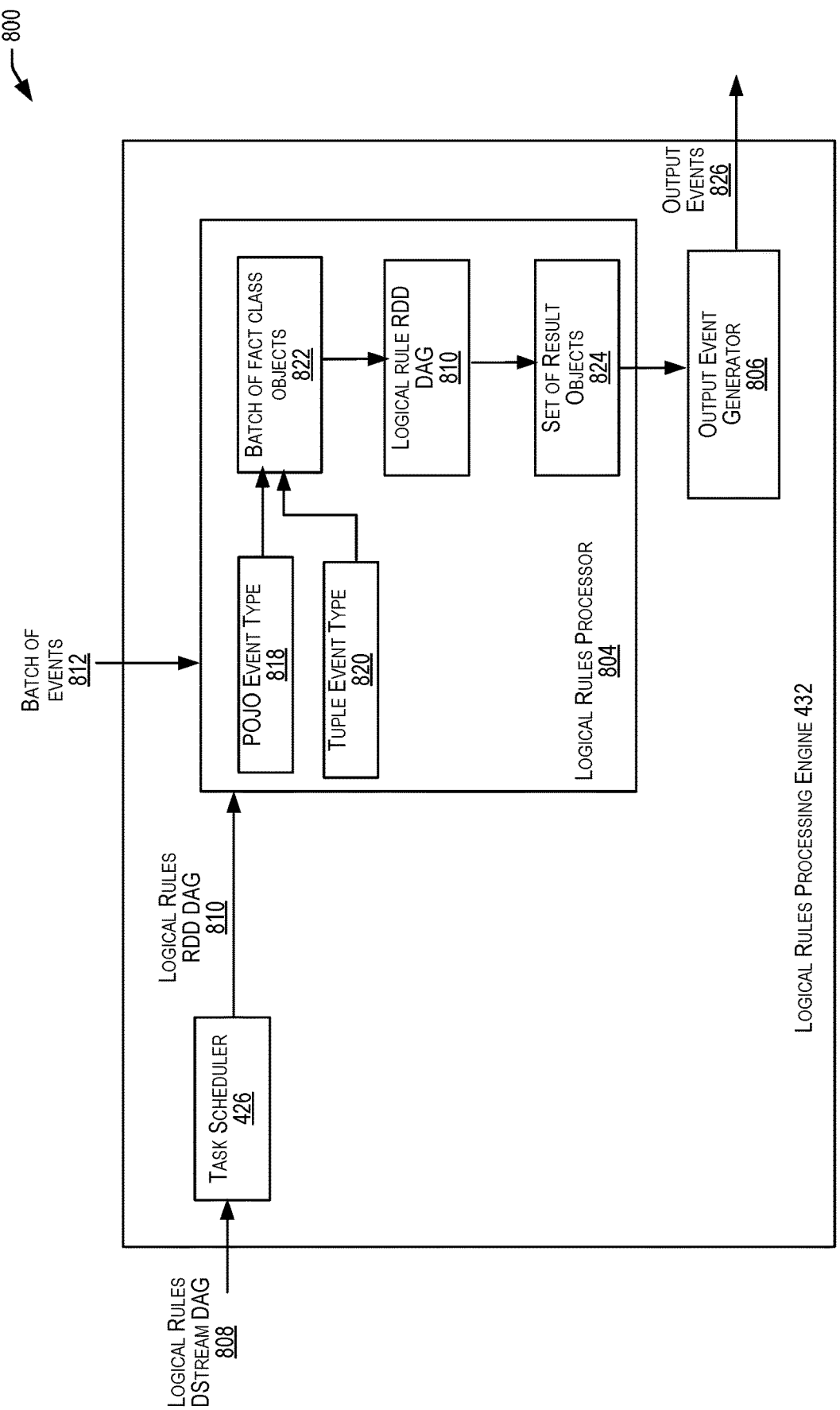
FIG. 8 is a simplified a block diagram 800 illustrating the operations performed by the logic rules processing engine to process a set of logic rules defined in an application, in accordance with an embodiment of the present disclosure.
Figure 9:
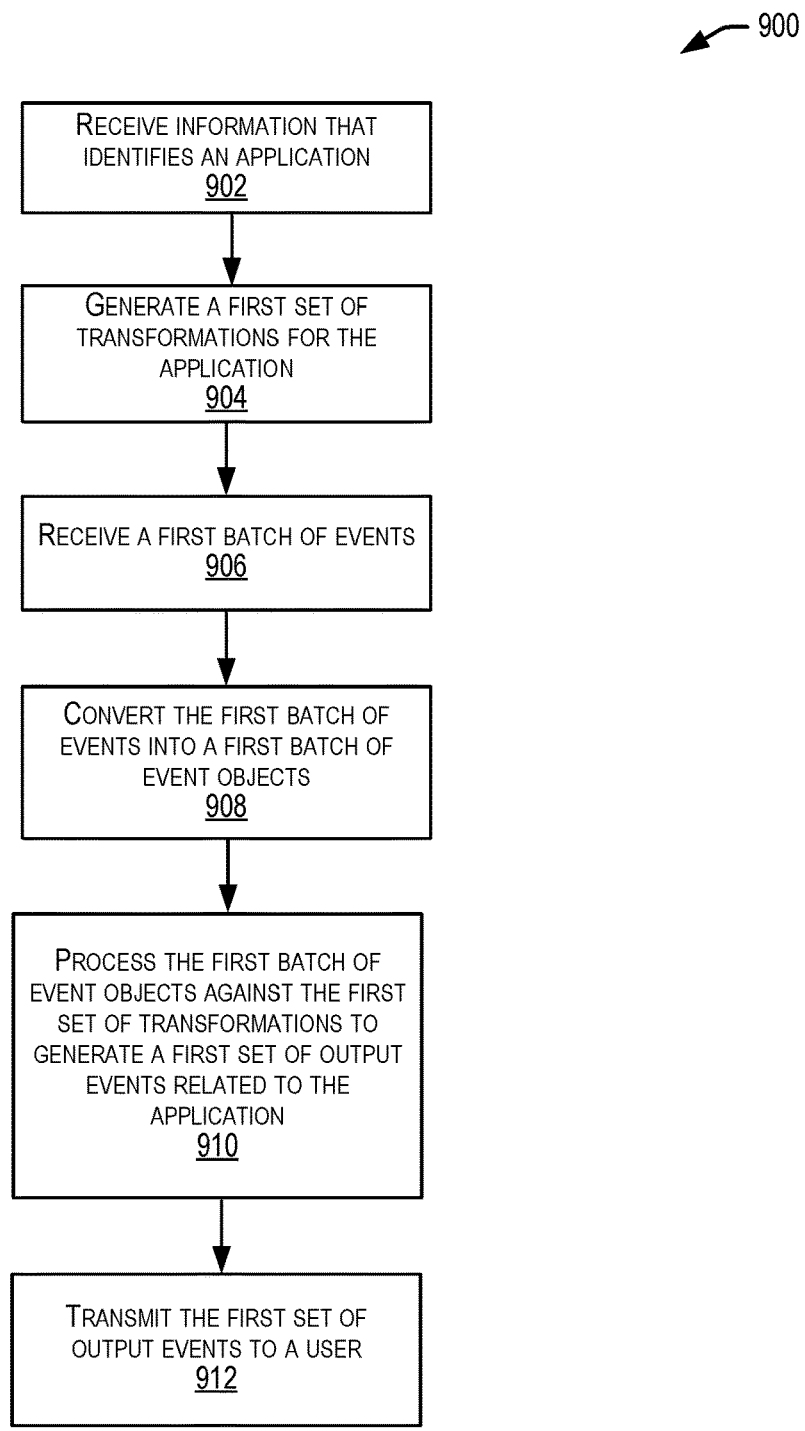
FIG. 9 is an exemplary flow diagram of a process 900 that describes a set of operations performed by the distributed event processing system 400, in accordance with an embodiment of the present disclosure.
Figure 10:
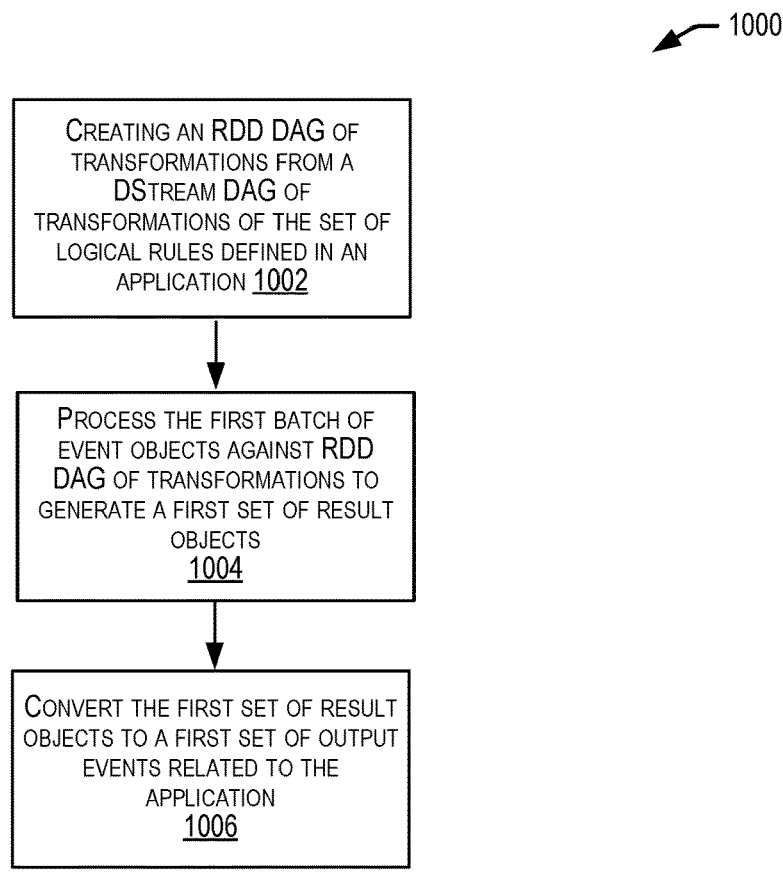
FIG. 10 is an exemplary flow diagram of a process 1000 that describes a set of operations performed by the distributed event processing system 400, in accordance with another embodiment of the present disclosure.

FIGS. 5-10 describe additional details of the operations performed by one or more components of the distributed event processing system to process and execute event processing applications. In particular, FIG. 5 illustrates an exemplary application built by a user of the distributed event processing. FIG. 6 illustrates an exemplary DAG of transformations generated by the logical rules processing engine 432 in the distributed event processing system to process a set of logical rules defined in the application. FIG. 7 illustrates an exemplary DAG of transformations generated by the CQL query processing engine 434 in the distributed event processing system to process a set of continuous queries (e.g., CQL queries) defined in the application. FIG. 10 illustrates a set of operations performed by the logical rules processing engine to process a set of logical rules defined in the application.

FIG. 5 is a high level overview of the structure of an exemplary application 500 built by a user of the distributed event processing system, in accordance with an embodiment of the present disclosure. In the illustrated example, the application is a 'cab ride sharing service' application 500 that receives requests from passengers and identifies drivers within a vicinity who can pick up and drop off the passengers to their desired destinations. In an embodiment, the application 500 is built using a combination of CQL queries and logical rules. For instance, in order to build such an application, the user may, for instance, need to first determine a set of drivers who are within a vicinity/area (e.g., within an 'x' meter radius) of the passenger who requested for the ride service and then determine from among the set of drivers, the driver who can best service the passenger's request. For instance, in order to determine a set of drivers who are within the vicinity of the passenger, the user can write a CQL query that can determine this information based on the latitude and longitude of the driver as the driver drives within a particular radius. In order to determine a 'best driver match' for a passenger, the user can then write a set of one or more logical rules that can determine the 'best driver match' by computing a driver score for each driver based on a plurality of parameters associated with the driver. Additional details of the manner in which such an application can be built is described below.

In the illustrated example, the application 500 may be configured to receive a set of one or more events via one or more continuous stream of events. In one example, the one or more continuous stream of events may include a first continuous stream of events 502 (i.e., the DriverStatusStream) and a second continuous stream of events 504 (i.e., the PassengerRequestStream). The first continuous stream of events 502 may comprise events that relate to information about all drivers known to the system. Each event in the first continuous stream of events 502 can comprise one or more attributes that include information about a driver, such as the driver's identification (DriverID), the driver's location (latitude, longitude), and the driver's status (available, not available). As each event in the first continuous stream of events 502 is received by the application 500, they are stored in an Instant Relation table 506. The instant relation table converts the stream into a continuous relation by inserting, updating, and deleting the events from the stream into the relation store using a key (DriverID). The continuous relation sends+, U events, insert, delete, and update events respectively to the downstream stage 510.

The second continuous stream of events 504 (PassengerRequestStream) may comprise events that relate to information about passengers who are requesting ride services. Each event in the second continuous stream of events 504 can comprise one or more attributes that include information about a passenger, such as the passenger's identification (PassengerID), the passenger's location (latitude, longitude), and the passenger's status (waiting, matched). As each event in the second continuous stream of events 504 is received, they are stored in the Pass-through Instant Relation Table 508. The instant relation table 508 is similar to the instant relation 506 for DriverStatusStream but this keeps the passenger request into the store and sends only +(insert) to the downstream stage 510.

In certain embodiments, the application 500 may then be configured to process the events received via the first continuous stream of events 502 and the second continuous stream of events 504 against a set of instructions (e.g., continuous queries and/or the logical rules) defined in the application to generate a set of results for the user. In one example, and as noted above, the application 500 can be built using a combination of one or more continuous queries and logical rules. The continuous queries may include a first continuous query 510 that comprises a 'Within Distance' function that returns drivers that are within 'x' meters of the passenger and a second continuous query (Event Enrichment Query) 512 that takes the result of the processing performed by the first continuous query 510 to retrieve information (for e.g., from a data storage 514) about the drivers that can be associated with the passenger identified by the first continuous query 506.

An example of the implementation of the first continuous query 510 is shown below:

```
RStream(
    select p.id as passengerId, f.id as driverId,
    distance@spatial(f.location, p.location) as distance
    from PassengerRequest[NOW] as p, DriverStatus as f
    where withindistance@spatial(f.location, p.location,
    2500.0d) = true
```

In the above example, the Request Stream comprises events from the first continuous stream of events 502 (DriverStatusStream) and the second continuous stream of events 504 (PassengerRequestStream). The distance@spatial function computes the distance between the passenger and the driver, and the withindistance@spatial function filters the events only to the drivers and passengers within a particular distance (e.g., 2500 meters). The query runs a spatial join between the PassengerRequest stream and Driver status relation using the 'withindistance' as the filter and generates output events of (passengerId, driverId, distance).

An example of the implementation of the second continuous query (e.g., the Event Enrichment Query) 512 is shown below:

```
create view Drivers(passengerId bigint, driverId bigint, distance double,
driverName char(40), driverMale int, driverAge int, driverNoTrips int,
driverRating int) AS select S.passengerId as passengerId, S.driverId as
driverId, S.distance as distance, Ext.NAME as driverName, Ext.MALE as
driverMale, Ext.AGE as driverAge, Ext.NO_TRIPS as driverNoTrips,
ExtRATING as driverRating
from PDStream[now] as S, DRIVER as Ext where S.driverId = Ext.ID
    .....    ;
```

The query 512 runs an external join of the output stream from the query 510 and the external DB table, DRIVER in 514 and generates events that have detailed driver information, and hence, in an example, is referred to as an event enrichment query.

In certain examples, and as noted above, the application 500 can further be built using a set of one or more logical rules 516. In an example, the set of one or more logical rules 516 may be expressed as a set of one or more if-then rules defined by the user. In the illustrated example of the 'ride sharing service' application 500, the set of one or more logical rules 516 can compute a 'driver score' for each driver identified by the second continuous query 512. In an example, the 'driver score' for a driver can be computed based on a plurality of parameters associated with the driver. The parameters associated with a driver can include, for instance, the current distance of the driver to the passenger's location, the driver's gender, the driver's driving history (e.g., the number of previous trips taken by the driver), the driver's rating, and so on. An example of the implementation of the set of logical rules 512 to compute and assign a 'driver score' for a driver is shown below:

```
if (distance < 500) score += 20
if (distance >= 500 && distance < 1500) score += 10
if (distance > =1500 && distance < 2000) score += 5
if (driver.gender == passenger.gender) score += 10
if (driver.noTrips > 500) score += 10
if (driver.rating > 50) score += 10
```

The application 500 may further comprise a third continuous query 518 (e.g., the Driver Match query) that can compute the 'best driver match' for a passenger based on the driver scores obtained for each of the identified drivers using the set of logical rules 512. In an example, the third continuous query 518 may be expressed as shown below:

```
create view ScoreOrdered(passengerId bigint, driverId bigint, distance
double) AS select M.fldPASSENGERID as passengerId, M.fldDRIVERID
as driverId, M.fldDISTANCE as distance from MatchDetails as M order
by M.fldSCORE desc rows 5 partition by M.fldPASSENGERID;
select passengerId, driverId, distance from ScoreOrdered
where TestAndSet("DriverStatusStore", driverId, 1, true, false,
"PassengerRequestStore", passengerId, 2, -1, driverId) = true.
```

In certain embodiments, the application 500 may further comprise instructions to output the best driver match to the user. For example, the application 500 may include a fourth continuous query (e.g., the Output query) 520 that outputs the best driver match. The output may be stored, in some examples, in a data storage (e.g., Kafka storage 522). As used herein, Kafka refers to a distributed, partitioned replicated data storage mechanism that enables the storage of information from data streams that are partitioned over a cluster of machines. Kafka provides a user-centric design that offers strong durability and fault-tolerance guarantees since it enables the partitioning of data streams over a cluster of machines to allow data streams larger than the capability of any single machine to be processed.

In certain embodiments, the output can be transmitted to the user via an Activity Monitoring (AM) UI 522 (e.g., using the application design UI 404). In some examples, the AM UI 522 may include a dashboard that provides real-time dynamic, analytics related to the visibility and insight of operations for the user. Additionally, in some examples, the AM UI 522 can provide information related to detecting and responding to a developing situation (e.g., trend and pattern) related to the application and provide a report of such patterns to the user.

FIG. 6 illustrates an exemplary DAG of transformations generated by the logical rules processing engine to process a set of logical rules defined in the application, in accordance with an embodiment of the present disclosure. In an embodiment, the logical rules processing engine 432 may be configured to generate a Rules DStream 604 from a Child Dstream 602 and process the Rules DStream 604 to generate a Parent DStream 606. In an example, the Rules DStream 604 may be configured to store a metadata associated with rules, such as a the location (URL) of the rule file, and the fact event type). In certain examples, the rule file is a compiled rule dictionary generated from the set of logical rules described above. An example of such a rule dictionary to compute and assign a 'driver score; for a driver is shown below:

```
<?xml version="1.0"?>
<RuleDictionary id="G}665777fb:14d2995ee8c:-7ffe"
xmlns="http://xmlns.oracle.com/rules/dictionary">
  <Name>MyRules2</Name>
  <Alias>MyRules2</Alias>
  <Package>tradereport</Package>
  <Version>12.1.1.0.0</Version>
  <DataModel id="L}1">
    <CreationUpdateNumber>2</CreationUpdateNumber>
    <QualifierPattern>{member} of {fact}</QualifierPattern>
    <Variable id="G}-10351ff:14d2a03d291:-7bd8">
      <Name>streamSender</Name>
      <Alias>streamSender</Alias>
      <Description>used to send events downstream</Description>
      <Visible>true</Visible>
      <CreationUpdateNumber>44</CreationUpdateNumber>
      <IDofType>J}com.bea.wlevs.ede.api.StreamSender</IDofType>
      <ListContentID>B}nil</ListContentID>
      <Type>StreamSender</Type>
      <IDofBucketSet>B}nil</IDofBucketSet>
      <Expression id="L}121">
        <Value>null</Value>
        <ResolvedValue>null</ResolvedValue>
        <IsConstant>false</IsConstant>
        <ParameterID>B}nil</ParameterID>
      </Expression>
      <Final>false</Final>
      <System>false</System>
      <ValidationUpdateNumber>50</ValidationUpdateNumber>
    </Variable>
    <Function id="G}-10351ff:14d2a03d291:-7bda">
      <Name>sendAndRetract</Name>
      <Alias>send and retract</Alias>
      <Description>Send the event and retract from Working
Memory</Description>
      <Visible>true</Visible>
      <CreationUpdateNumber>34</CreationUpdateNumber>
      <IDofType>J}void</IDofType>
      <ListContentID>B}nil</ListContentID>
      <Type>void</Type>
      <IDofBucketSet>B}nil</IDofBucketSet>
      <Form>Structured</Form>
      <FormalParameter id="G}-10351ff:14d2a03d291:-7bd9">
        <Name>event</Name>
        <Alias>event</Alias>
        <Visible>true</Visible>
```

```
<CreationUpdateNumber>40</CreationUpdateNumber>
<IDofType>
J}oracle.wlevs.strex.generated.sx_3_78_ScoringRule_1
</IDofType>
<ListContentID>B}nil</ListContentID>
<Type>sx_3_78_ScoringRule_1</Type>
<IDofBucketSet>B}nil</IDofBucketSet>
</FormalParameter>
<Action id="L}118">
<Form>Call</Form>
<Target>streamSender.sendInsertEvent</Target>
<ResolvedTarget>`G}-10351ff:14d2a03d291:-7bd8`.`J}public abstract
void com.bea.wlevs.ede.api.StreamSender.sendInsertEvent
(java.lang.Object) throws com.bea.wlevs.ede.api.EventRejectedException`
</ResolvedTarget>
<Expression id="L}136">
<Value>event</Value>
<ResolvedValue>`G}-10351ff:14d2a03d291:-7bd9`
</ResolvedValue>
<IsConstant>false</IsConstant>
<ParameterID>GI-10351ff:14d2a03d291:-7bdb</ParameterID>
</Expression>
<DSLId>B}nil</DSLId>
</Action>
```

The fact event type is a java class that is used to inject facts into the Rule Dstream. In an embodiment, the class can be generated by the application design user interface 404. The following shows the example of such a fact event type:

```
public class sx_3_78_ScoringRule_1 {
    @XmlElement(name = "PASSENGERID")
    private long fldPASSENGERID;
    @XmlElement(name = "DRIVERID")
    private long fldDRIVERID;
    @XmlElement(name = "DISTANCE")
    private double fldDISTANCE;
    @XmlElement(name = "PASSENGERMALE")
    private int fldPASSENGERMALE;
    @XmlElement(name = "DRIVERMALE")
    private int fldDRIVERMALE;
    @XmlElement(name = "DRIVERNOTRIPS")
    private int fldDRIVERNOTRIPS;
    @XmlElement(name = "DRIVERRATING")
    private int fldDRIVERRATING;
    @XmlElement(name = "SCORE")
    private int fldSCORE;
```

In certain embodiments, the rules DStream 604 is used to create Rule RDDs for each event batch. In an embodiment, a logical rules RDD DAG of transformations for an application may include the set of logical rules to be applied to the batch of events, a Plain Old Java Object (POJO) event type corresponding to the events in a batch of events, and a tuple event type corresponding to the output events from the batch of events. A POJO event type for an event used herein may correspond to, for instance, a rule (e.g., sx_3_78_ScoringRule_1) shown in the rule dictionary illustrated in FIG. 6. In an example, a tuple event type for an event may be represented as follows:

```
val resultEventType = EventType("results",
BigIntAttr("fldPASSENGERID"),BigIntAttr("fldDRIVERID"),
DoubleAttr("fldDISTANCE"),
    VarCharAttr("fldPASSENGERNAME", 40),
IntAttr("fldPASSENGERMALE"), IntAttr("fldPASSENGERAGE"),
IntAttr("fldPASSENGERNOTRIPS"),
    VarCharAttr("fldDRIVERNAME", 40),
IntAttr("fldDRIVERMALE"), IntAttr("fldDRIVERAGE"),
IntAttr("fldDRIVERNOTRIPS"), IntAttr("fldDRIVERRATING"),
    IntAttr("fldSCORE")
```

FIG. 7 illustrates an exemplary DAG of transformations generated by CQL Query Processing Engine to process a set of continuous queries (e.g., CQL queries) defined in the application, in accordance with an embodiment of the present disclosure. In an embodiment, the CQL Query processing engine 434 may be configured to generate a CQL DStream 704 from a Child Dstream 702 and process the CQL DStream 704 to generate a Parent DStream 606. In an embodiment, the CQL DStream 704 contains the metadata about the CQL Stage including the query, the views, and the channel description (e.g., event type of the channel, and the channel type of the channel).

In certain embodiments, the CQL Dstream 704 is used to create CQL RDDs for each batch. The CQL RDD DAG of transformations runs a CQL Query against the events in the input batch of events and generates the output tuples by the CQL Query processing engine, in accordance with an embodiment of the present disclosure. For the 'ride sharing service' application described in FIG. 5, the following CQL queries may be used:

```
WithinDistance:
    RStream(
    select p.id as passengerId, f.id as driverId, distance@spatial(f.location, p.location) as
distance
    from PassengerRequest[NOW] as p, DriverStatus as f
    where withindistance@spatial(f.location, p.location, 2500.0d) = true
    );
EnrichDetails:
    create view Passengers(passengerId bigint, driverId bigint, distance double,
        passengerName char(40), passengerMale int, passengerAge int, passengerNoTrips int)
    AS
    select S.passengerId as passengerId, S.driverId as driverId, S.distance as distance,
        Ext.NAME as passengerName, Ext.MALE as passengerMale, Ext.AGE as
passengerAge, Ext.NO_TRIPS as passengerNoTrips
    from PDStream[now] as S, PASSENGER as Ext where S.passengerId = Ext.ID
    ;
    create view Drivers(passengerId bigint, driverId bigint, distance double,
        driverName char(40), driverMale int, driverAge int, driverNoTrips int, driverRating
int) AS
    select S.passengerId as passengerId, S.driverId as driverId, S.distance as distance,
        Ext.NAME as driverName, Ext.MALE as driverMale, Ext.AGE as driverAge,
```

```
Ext.NO_TRIPS as driverNoTrips, Ext.RATING as driverRating
    from PDStream[now] as S, DRIVER as Ext where S.driverId = Ext.ID
    ;
    IStream(
    select P.passengerId as fldPASSENGERID, D.driverId as fldDRIVERID, P.distance as
fldDISTANCE,
        P.passengerMale as fldPASSENGERMALE,
        D.driverMale as fldDRIVERMALE, D.driverNoTrips as fldDRIVERNOTRIPS,
D.driverRating as fldDRIVERRATING,
        0 as fldSCORE
        from Passengers as P, Drivers as D
        where ( P.passengerId = D.passengerId ) AND (P.driverId = D.driverId)
        );
Arbitration:
    create view ScoreOrdered(passengerId bigint, driverId bigint, distance double) AS
    select M.fldPASSENGERID as passengerId, M.fldDRIVERID as driverId,
M.fldDISTANCE as distance
        from MatchDetails as M
        order by M.fldSCORE desc rows 5 partition by M.fldPASSENGERID;
        select passengerId, driverId, distance
        from ScoreOrdered
            where TestAndSet("DriverStatusStore", driverId, 1, true, false,
                    "PassengerRequestStore", passengerId, 2, −1, driverId) = true
```

FIG. 8 is a simplified a block diagram 800 illustrating the operations performed by the logical rules processing engine to process a set of logical rules defined in an application, in accordance with an embodiment of the present disclosure. In certain embodiments, and as shown in FIG. 10, the logical rules processing engine 432 includes a logical rules processor 804 and an output event generator 806. The embodiment shown in FIG. 8 is one example of the logical rules processing engine 432 that may incorporate an embodiment of the disclosure. In other embodiments, the logical rules processing engine may have more or fewer components than shown in FIG. 8, may combine two or more components, or may have a different configuration or arrangement of components. These components may be implemented in hardware, firmware, software, or combinations thereof.

In certain embodiments, the Task Scheduler 426 is configured to create the logical rules RDD DAG of transformations 810 from a logical rules DStream DAG of transformations 808 (e.g., received, for example, from the DAG generator 424) As described above, the logical rules RDD DAG of transformations 810 may comprise, in certain examples, the set of logical rules to be applied to each batch of events, a Plain Old Java Object (POJO) event type corresponding to the events in the batch of events, and a tuple event type corresponding to the events in the batch of events. The logical rules RDD DAG of transformations 810 uses the metadata (e.g., the rules file URL and the fact event type) to process the input batch of events.

The logical rules processor 804 may then be configured to process a batch of events 812 against the logical rule RDD DAG of transformations 810 to generate a set of result objects 824. In certain examples, the logical rules processor 804 may be configured to first convert the events in the batch of events 812 into a batch of fact objects 822. As noted above, events in an event batch may be represented as a sequence of timestamped tuples. Each tuple representing an event may comprise timestamped attributes representing the begin and end of the occurrence interval of the event and a data attribute representing the data carried by the event. In an embodiment, the logical rules processor 804 processes each event (i.e., tuple) in the batch of events 812 by converting each tuple into an object of a fact class using a POJO Event Type 818 and a tuple event type 820 corresponding to the event/tuple to generate a batch of fact class objects 822. The batch of fact class objects 822 generated by the event converter 804 is further processed against the logical rules RDD DAG of transformations 810 to generate a set of result objects 824. The output event generator 806 converts the set of result objects 824 into a set of output tuples/output events 826 which are then transmitted to a user.

In certain embodiments, the logical rules processing engine 432 may be configured to receive the RDD DAG of transformations of the set of one or more continuous queries (e.g., from the CQL Query Processing Engine 434) and process the first batch of events 812 against the RDD DAG of transformations of the set of one or more logical rules and the RDD DAG of transformations of the set of one or more continuous queries to generate the set of output events 826 related to the application. The combined processing of the RDD DAG of transformations of the set of one or more logical rules and the set of one or more continuous queries may involve, for example, in the context of the driver application discussed in FIG. 5 above, categorizing the drivers based on the rating in one of the logical rules RDD DAG of transformations, applying another logical rules RDD DAG of transformations to score the matching by combining the categorization with other comparisons, and selecting the top match using the order by CQL RDD DAG.

Figure 11:
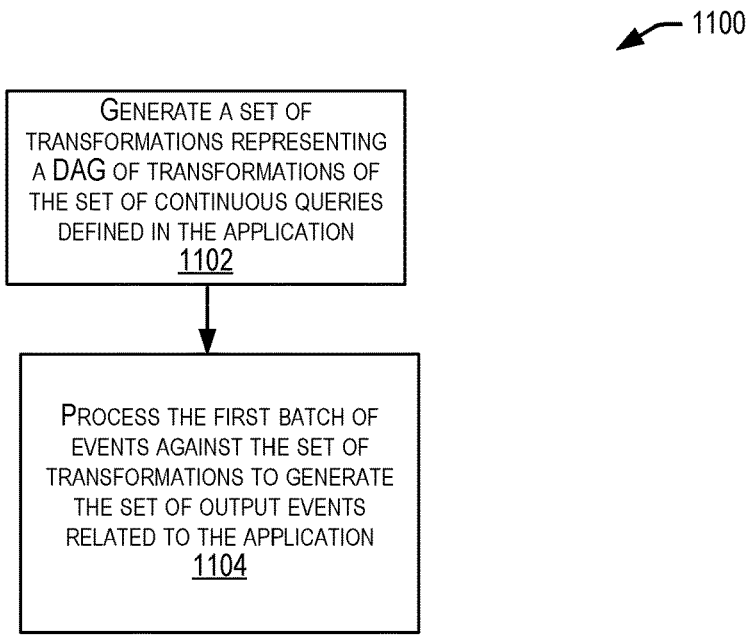
FIG. 11 is an exemplary flow diagram of a process 1100 that describes a set of operations performed by the distributed event processing system 400, in accordance with another embodiment of the present disclosure.

FIGS. 9-11 are flow diagrams of processes for implementing systems and methods described herein, in accordance with at least some embodiments. The processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory. In some examples, the distributed event processing system 400 (e.g., utilizing at least the application manager module 402 and the cluster of computing nodes 412 described in at least FIGS. 4A and 4B) may perform the processes 900, 1000, and 1100 of FIGS. 9-11 respectively.

FIG. 9 is an exemplary flow diagram of a process 900 that describes a set of operations performed by the distributed event processing system 400, in accordance with an embodiment of the present disclosure. In certain embodiments, the process 900 may be performed by the master computing node 416 in the cluster of computing nodes 412. At 902, the process includes receiving information that identifies an application. As noted above, such information may include a set of logical rules and/or CQL queries specified in the application and one or more application parameters associated with the application. At 904, the process includes generating a first set of transformations for the applications. In one example, the first set of transformations represent a DAG of the set of one or more logical rules defined in the application. In certain embodiments, at 906, the process includes receiving a first batch of events from a continuous data stream of events. At 908, the process includes converting the first batch of events into a first batch of event objects. At 910, the process includes processing the first batch of event objects against the first set of transformations to generate a first set of output events related to the application. The manner in which the first batch of event objects may be processed against the first set of transformations is discussed in detail in relation to FIG. 10. At 912, the process includes transmitting the first set of output events to a user of the system.

FIG. 10 is an exemplary flow diagram of a process 1000 that describes a set of operations performed by the distributed event processing system 400, in accordance with another embodiment of the present disclosure. In certain embodiments, the process 1000 describes operations performed by the logical rules processing engine 432 in the master computing node 416 to process a set of logical rules defined in an application against events in an event batch to generate a set of output events related to the application. At 1002, the process includes creating an RDD DAG of transformations of the set of logical rules from the DStream DAG of transformations of the set of logical rules defined in the application At 1004, the process includes processing the first batch of event objects against the RDD DAG of transformations to generate a first set of result objects. At 1006, the process includes converting the first set of result objects to the first set of output events related to the application.

FIG. 11 is an exemplary flow diagram of a process 1100 that describes a set of operations performed by the distributed event processing system 400, in accordance with another embodiment of the present disclosure. In certain embodiments, the process 1100 describes operations performed by the CQL Query Processing Engine 434 in the master computing node 416 to process a set of CQL defined in an application against events in an event batch to generate a set of output events related to the application. At 1102, the process includes generating a set of transformations representing a DAG of the set of continuous queries defined in the application. At 1104, the process includes processing the first batch of events against the set of transformations to generate the first set of output events related to the application.

Figure 12:
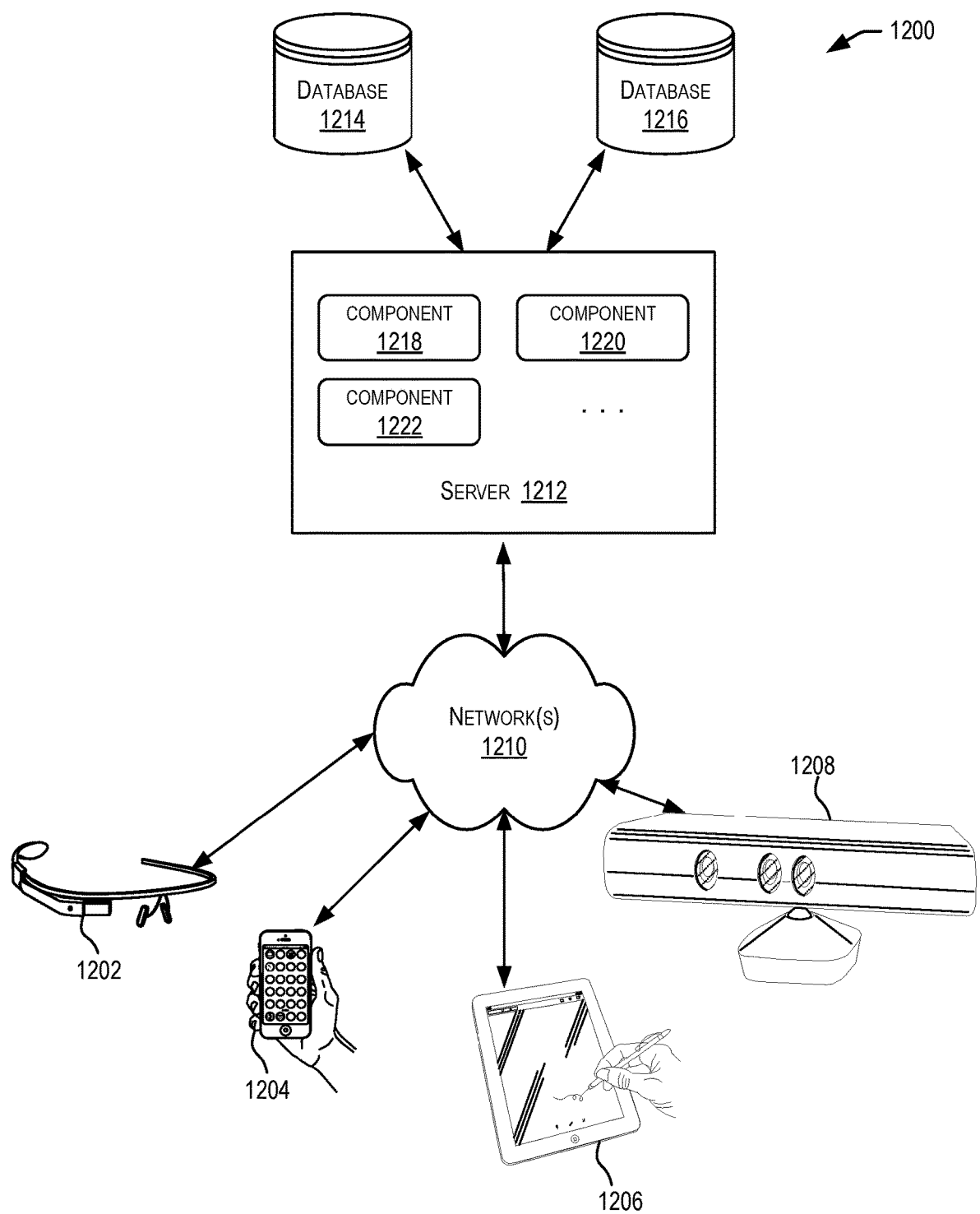
FIG. 12 depicts a simplified diagram of a distributed system for implementing one of the embodiments.
Figure 13:
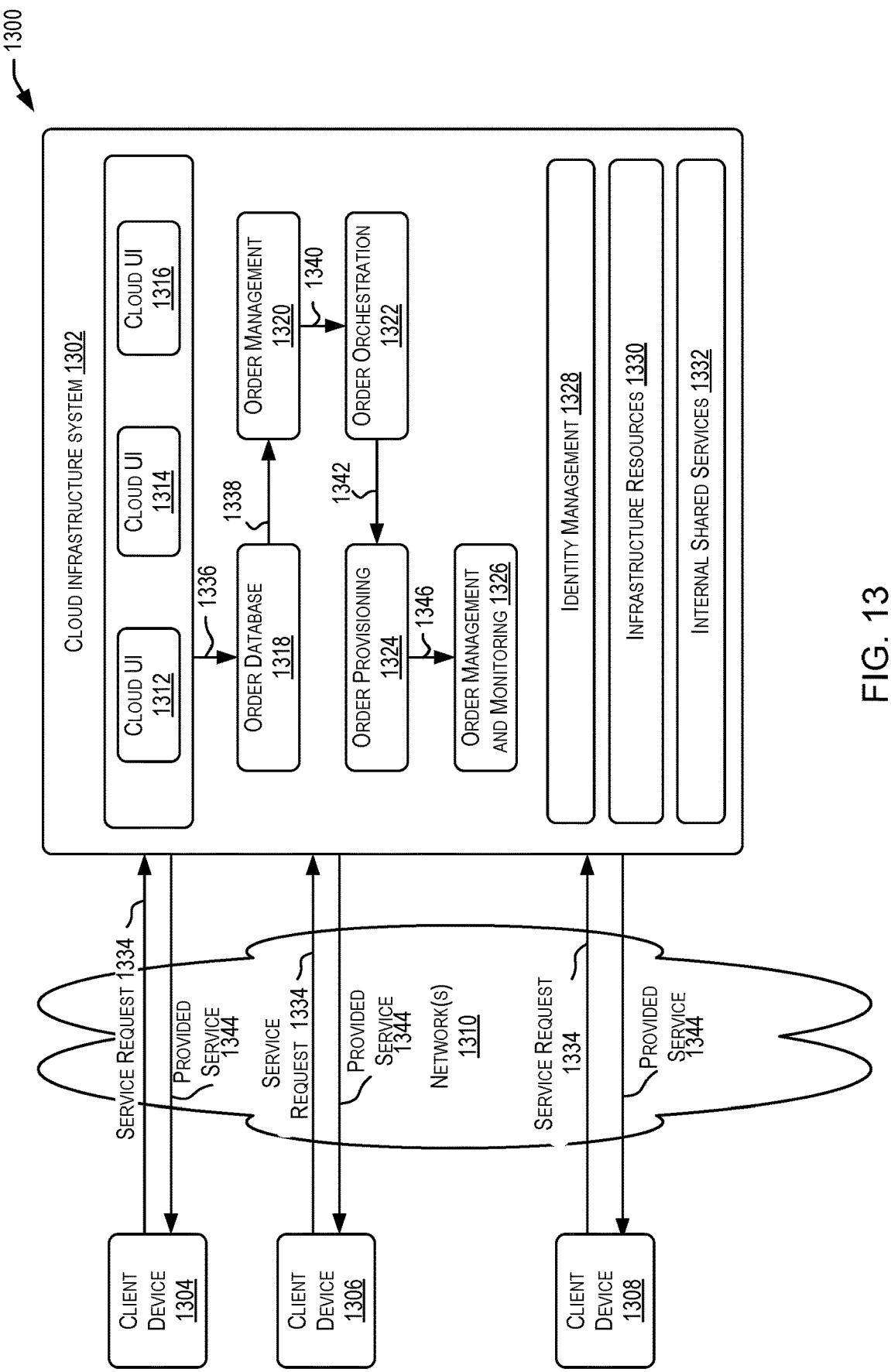
FIG. 13 is a simplified block diagram of one or more components of a system environment by which services provided by one or more components of an embodiment system may be offered as cloud services, in accordance with an embodiment of the present disclosure.
Figure 14:
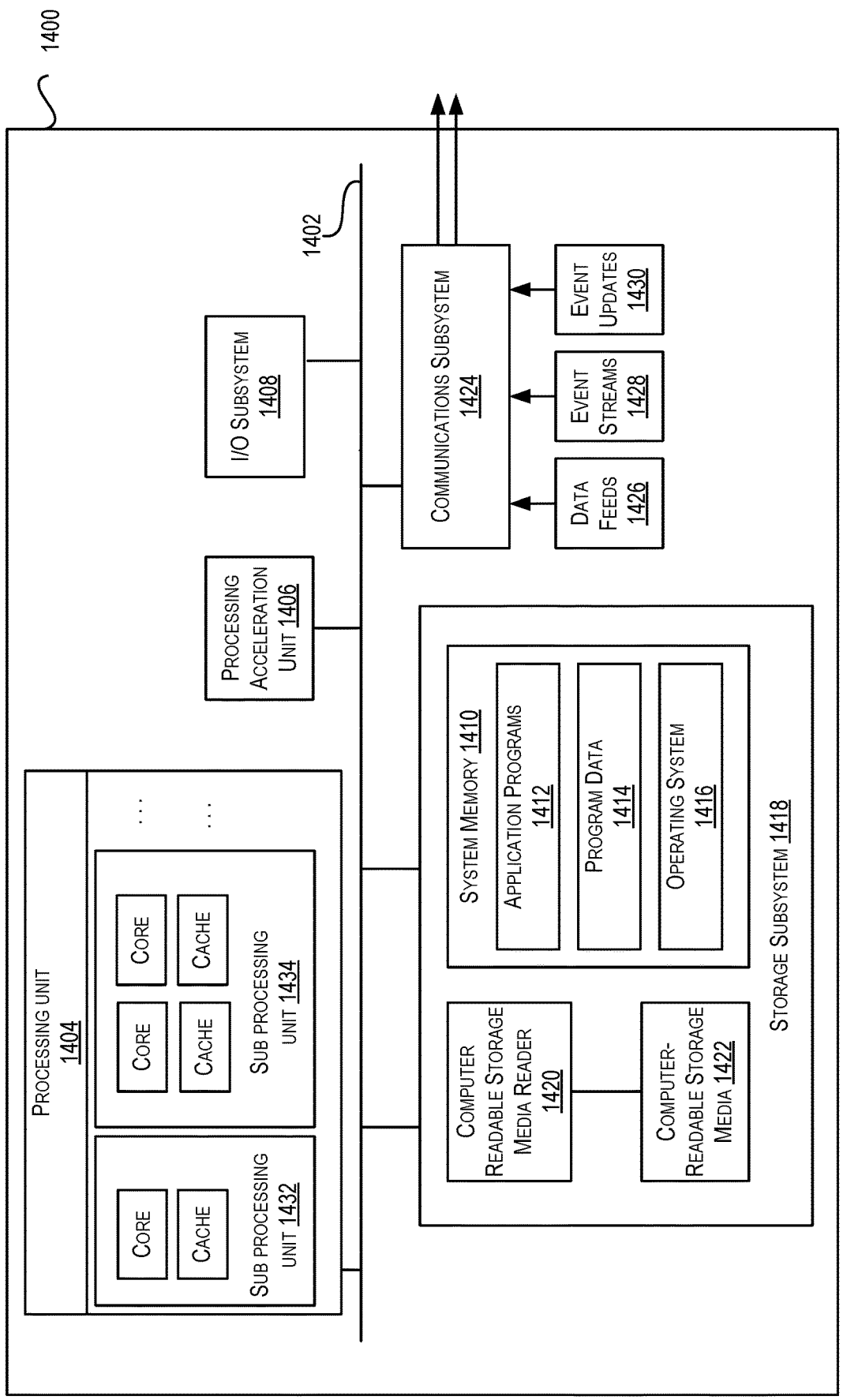
FIG. 14 illustrates an exemplary computer system 1400, in which various embodiments of the present disclosure may be implemented.

FIGS. 12-14 illustrate aspects of example environments for implementing aspects of the present disclosure in accordance with various embodiments. FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. The services or software applications can include non-virtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1212 can include one or more virtual machines running virtual operating systems, or other computing architectures involving virtualization. One or more flexible pools of logical storage devices can be virtualized to maintain virtual storage devices for the server. Virtual networks can be controlled by server 1212 using software defined networking. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1100 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the disclosure. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

Cloud infrastructure system 1302 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

FIG. 14 illustrates an exemplary computer system 1400, in which various embodiments of the present disclosure may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for processing a continuous data stream of events using a distributed event processing service, the method comprising:
    receiving, at a first computing device of a plurality of computing devices of the distributed event processing service, information that identifies an application, the information comprising at least a set of one or more logical rules to be applied to a continuous stream of events related to the application, the first computing device comprised in a cluster of computing nodes in the distributed event processing service and the cluster of computing nodes comprising at least a subset of the plurality of computing devices in the distributed event processing service;
    generating, by the first computing device, a first set of transformations for the application, the first set of transformations representing a Directed Acyclic Graph (DAG) of transformations of the set of one or more logical rules;
    receiving, at the first computing device, events from the continuous stream of events;
    generating, by the first computing device, a snapshot of each of the events from the continuous stream of events during a time period;
    generating, by the first computing device, a first batch of events based at least in part on the snapshot, the first batch of events represented as a Resilient Distributed Dataset (RDD);
    converting, by the first computing device, the first batch of events into a first batch of event objects;
    processing, by a second computing device of the of the plurality of computing devices of the distributed event processing service, the first batch of event objects against the first set of transformations to generate a first set of output events related to the application; and
    transmitting, by the second computing device, the first set of output events to a user of the distributed event processing service.

2. The method of claim 1, wherein processing, by the second computing device, the first batch of event objects further comprises:
    creating a Resilient Distributed Dataset (RDD) DAG of transformations of the set of one or more logical rules defined in the application;
    processing, by the second computing device, the first batch of event objects against the RDD DAG of transformations to generate a first set of result objects; and
    converting, by the second computing device, the first set of result objects to the first set of output events related to the application.

3. The method of claim 2, wherein the RDD DAG of transformations comprise at least one of the set of one or more logical rules to be applied to at least the first batch of events, a tuple event type corresponding to the events in the first batch of events, and a Plain Old Java Object (POJO) event type corresponding to the events in the first batch of events.

4. The method of claim 1, wherein the information that identifies an application further comprises a set of one or more continuous queries.

5. The method of claim 4, wherein the first batch of events are further processed against the set of one or more continuous queries to generate the first set of output events related to the application.

6. The method of claim 5, further comprising:
    generating, by the first computing device, a second set of transformations for the application, the second set of transformations representing a DAG of transformations of the set of one or more continuous queries defined in the application; and
    processing, by the second computing device, the first batch of events against the second set of transformations to generate the first set of output events related to the application.

7. The method of claim 1, wherein the set of one or more logical rules comprise a set of if-then rules related to one or more operations to be performed by the application.

8. The method of claim 1, wherein the information that identifies an application further comprises at least one of a deployment type parameter that specifies a type of deployment of the application on the cluster of computing nodes in the distributed event processing system and one or more configuration parameters related to the application.

9. A computer-readable medium storing computer-executable instructions that, when executed by one or more processors of a distributed event processing service, configures one or more computer systems to perform at least:
    instructions that cause the one or more processors to receive information that identifies an application, the information comprising at least a set of one or more logical rules to be applied to a continuous stream of events related to the application, the one or more processors comprised in a cluster of computing nodes in the distributed event processing service and the cluster of computing nodes comprising at least a subset of the plurality of computing devices in the distributed event processing service;
    instructions that cause the one or more processors to generate a first set of transformations for the application, the first set of transformations representing a Directed Acyclic Graph (DAG) of transformations of the set of one or more logical rules;
    instructions that cause the one or more processors to receive events from the continuous stream of events;
    instructions that cause the one or more processors to generate a snapshot of each of the events from the continuous stream of events during a time period;
    instructions that cause the one or more processors to generate a first batch of events based at least in part on the snapshot, the first batch of events represented as a Resilient Distributed Dataset (RDD);
    instructions that cause the one or more processors to convert the first batch of events into a first batch of event objects;
    instructions that cause the one or more processors to process the first batch of event objects against the first set of transformations to generate a first set of output events related to the application; and instructions that cause the one or more processors to transmit the first set of output events to a user of the distributed event processing service.

10. The computer-readable medium of claim 9, wherein the instructions that cause the one or more processors to process the first batch of event objects further comprise instructions that cause the one or more processors to:

create a Resilient Distributed Dataset (RDD) DAG of transformations of the set of one or more logical rules defined in the application;

process the first batch of event objects against the RDD DAG of transformations to generate a first set of result objects; and convert the first set of result objects to the first set of output events related to the application.

11. The computer-readable medium of claim 10, wherein the RDD DAG of transformations comprise at least one of the set of one or more logical rules to be applied to at least the first batch of events, a tuple event type corresponding to the events in the first batch of events, and a Plain Old Java Object (POJO) event type corresponding to the events in the first batch of events.

12. The computer-readable medium of claim 9, wherein the information that identifies an application further comprises a set of one or more continuous queries.

13. The computer-readable medium of claim 9, wherein the first batch of events are further processed against the set of one or more continuous queries to generate the first set of output events related to the application.

14. The computer-readable medium of claim 9, further comprising instructions that cause the one or more processors to:

generate a second set of transformations for the application, the second set of transformations representing a DAG of transformations of the set of one or more continuous queries defined in the application; and process the first batch of events against the second set of transformations to generate the first set of output events related to the application.

15. The computer-readable medium of claim 9, wherein the information that identifies an application further comprises at least one of a deployment type parameter that specifies a type of deployment of the application on the cluster of computing nodes in the distributed event processing service and one or more configuration parameters related to the application.

16. A system implementing a distributed event processing service, comprising:

a memory storing a plurality of instructions; and a processor configured to access the memory, the processor further configured to execute the plurality of instructions to at least:

receive, at a first computing device of a plurality of computing devices of the distributed event processing service, information that identifies an application, the information comprising at least a set of one or more logical rules to be applied to a continuous stream of events related to the application, the first computing device comprised in a cluster of computing nodes in the distributed event processing service and the cluster of computing nodes comprising at least a subset of the plurality of computing devices in the distributed event processing service;

generate a first set of transformations for the application, the first set of transformations representing a Directed Acyclic Graph (DAG) of transformations of the set of one or more logical rules;

receive events from the continuous stream of events;

generate a snapshot of each of the events from the continuous stream of events during a time period;

generating a first batch of events based at least in part on the snapshot, the first batch of events represented as a Resilient Distributed Dataset (RDD);

convert the first batch of events into a first batch of event objects;

process the first batch of event objects against the first set of transformations to generate a first set of output events related to the application; and transmit the first set of output events to a user of the distributed event processing service.

17. The system of claim 16, wherein the processor is further configured to execute the plurality of instructions to:

create a Resilient Distributed Dataset (RDD) DAG of transformations of the set of one or more logical rules defined in the application;

process the first batch of event objects against the RDD DAG of transformations to generate a first set of result objects; and convert the first set of result objects to the first set of output events related to the application.

18. The system of claim 17, wherein the RDD DAG of transformations comprise at least one of the set of one or more logical rules to be applied to at least the first batch of events, a tuple event type corresponding to the events in the first batch of events, and a Plain Old Java Object (POJO) event type corresponding to the events in the first batch of events.

19. The system of claim 16, wherein the information that identifies an application further comprises a set of one or more continuous queries.

20. The system of claim 16, wherein the first batch of events are further processed against the set of one or more continuous queries to generate the first set of output events related to the application.

* * * * *

UNITED STATES PATENT AND TRADEMARK OFFICE
CERTIFICATE OF CORRECTION

PATENT NO. : 10,880,363 B2  
APPLICATION NO. : 16/559913  
DATED : December 29, 2020  
INVENTOR(S) : Park et al.

Page 1 of 1

It is certified that error appears in the above-identified patent and that said Letters Patent is hereby corrected as shown below:

In the Specification

In Column 22, Line 22, delete "a the" and insert -- the --, therefor.

In the Claims

In Column 39, Line 48, in Claim 1, delete "of the of the" and insert -- of the --, therefor.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*